(12) United States Patent
Nomura

(10) Patent No.: US 10,962,842 B2
(45) Date of Patent: Mar. 30, 2021

(54) LIQUID CRYSTAL DISPLAY DEVICE

(71) Applicant: Japan Display Inc., Tokyo (JP)

(72) Inventor: Morikazu Nomura, Aichi (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/538,169

(22) Filed: Aug. 12, 2019

(65) Prior Publication Data

US 2019/0361275 A1 Nov. 28, 2019

Related U.S. Application Data

(63) Continuation of application No. 15/459,834, filed on Mar. 15, 2017, now Pat. No. 10,379,404, which is a
(Continued)

(30) Foreign Application Priority Data

Mar. 6, 2012 (JP) ................................. 2012-048708

(51) Int. Cl.
*G02F 1/1339* (2006.01)
*G02F 1/1335* (2006.01)
*G02F 1/1362* (2006.01)

(52) U.S. Cl.
CPC ........ *G02F 1/1339* (2013.01); *G02F 1/13394* (2013.01); *G02F 1/133512* (2013.01);
(Continued)

(58) Field of Classification Search
CPC ............... G02F 1/1339; G02F 1/13394; G02F 1/133512; G02F 2001/13396
See application file for complete search history.

(56) References Cited

U.S. PATENT DOCUMENTS 6,774,975 B2 8/2004 Ahn
6,788,372 B1 9/2004 Kaise et al.
(Continued)

FOREIGN PATENT DOCUMENTS

CN 101900913 12/2010
JP 09-105945 4/1997
(Continued)

OTHER PUBLICATIONS

Chinese Office Action dated Jul. 22, 2016 in corresponding Chinese Application No. 201310038708.1.
(Continued)

*Primary Examiner* — Angela K Davison
(74) *Attorney, Agent, or Firm* — K&L Gates LLP

(57) ABSTRACT

A liquid crystal display device is provided and including a first substrate having a first surface; a second substrate having a second surface that is opposed to and spaced from the first surface; and a liquid crystal layer and a plurality of spacers arranged between the first and second surfaces, the spacers each including a first spacer section having a first center in a first direction, the first spacer section protruding from the first surface into the liquid crystal layer, a second spacer section having a second center in the first direction, the second spacer section protruding from the second surface into the liquid crystal layer and opposed to and spaced from the first spacer section or being in contact with the first spacer section, wherein, in each of the spacers, the second center position is different from the first center position in the first direction.

15 Claims, 21 Drawing Sheets

Related U.S. Application Data continuation of application No. 13/740,915, filed on Jan. 14, 2013, now Pat. No. 9,638,961.

(52) U.S. Cl.
CPC .............. *G02F 2001/13396* (2013.01); *G02F 2001/136295* (2013.01); *G02F 2201/503* (2013.01)

(56) References Cited

U.S. PATENT DOCUMENTS

| | | | |
|---|---|---|---|
| 8,120,252 | B2 | 2/2012 | Cho |
| 2008/0198317 | A1* | 8/2008 | Tseng .................. G02F 1/13394 349/138 |
| 2009/0122241 | A1 | 5/2009 | Satoh |
| 2009/0160748 | A1 | 6/2009 | Kimura |
| 2009/0168167 | A1* | 7/2009 | Hiroya .................. G02B 30/27 359/477 |
| 2010/0045906 | A1 | 2/2010 | Tokuda et al. |
| 2010/0231842 | A1 | 9/2010 | Ishitani et al. |
| 2010/0302492 | A1 | 12/2010 | Kubota et al. |
| 2012/0268699 | A1* | 10/2012 | Min .................... G02F 1/13394 349/106 |

FOREIGN PATENT DOCUMENTS

| | | |
|---|---|---|
| JP | 11-174487 | 7/1999 |
| JP | 2000-206541 | 7/2000 |
| JP | 2003-186023 | 7/2003 |
| JP | 2010-054622 | 3/2010 |
| JP | 2010-224097 | 10/2010 |
| JP | 2010-237660 | 10/2010 |
| TW | 201106069 | 2/2011 |
| WO | 2008/065818 | 6/2008 |

OTHER PUBLICATIONS

Japanese Office Action dated Mar. 3, 2015 in corresponding Japanese Application No. 2012-048708.
Taiwan Office Action dated Feb. 4, 2015 in corresponding Taiwanese Application No. 101142105.
Definition of word "at", Merriam-Webster Online Dictionary; definition downloaded on Sep. 9, 2015.
Japanese Office Action dated Jan. 9, 2018 in corresponding Japanese Application No. 2017-047603.
Chinese Office Action dated Aug. 5, 2020, in corresponding Chinese Application No. 201810324948.0.

* cited by examiner

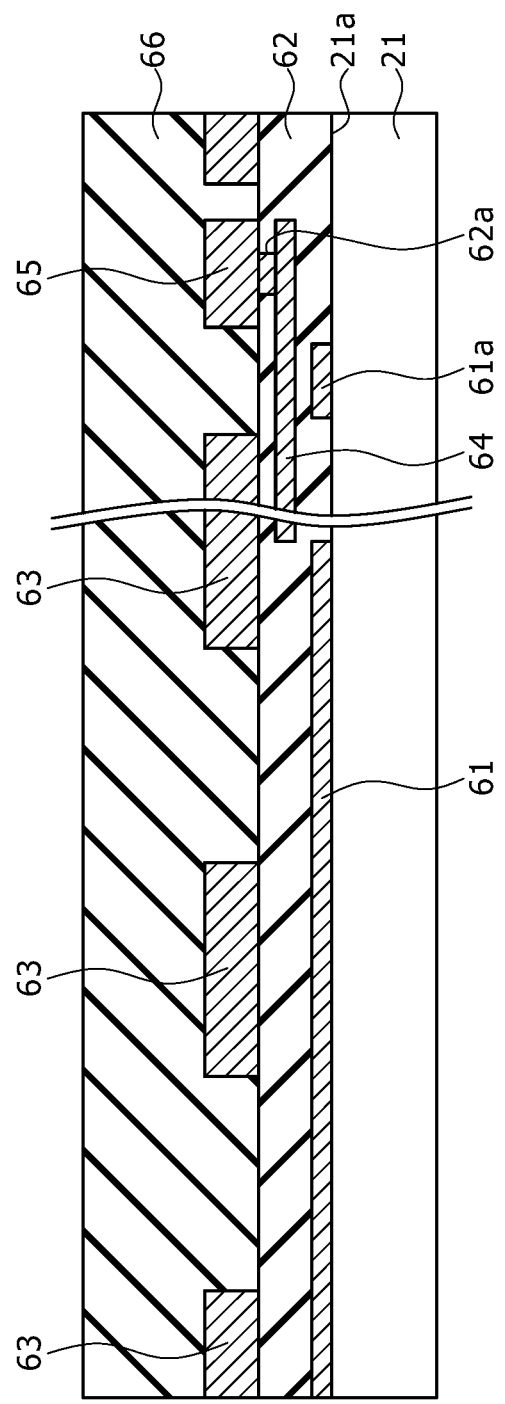

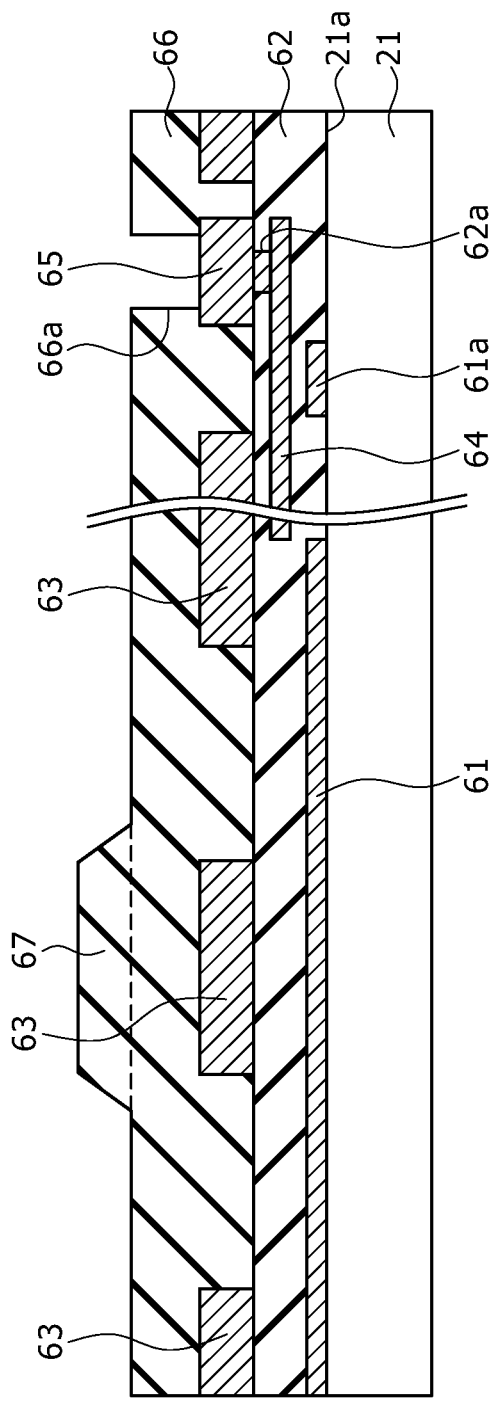

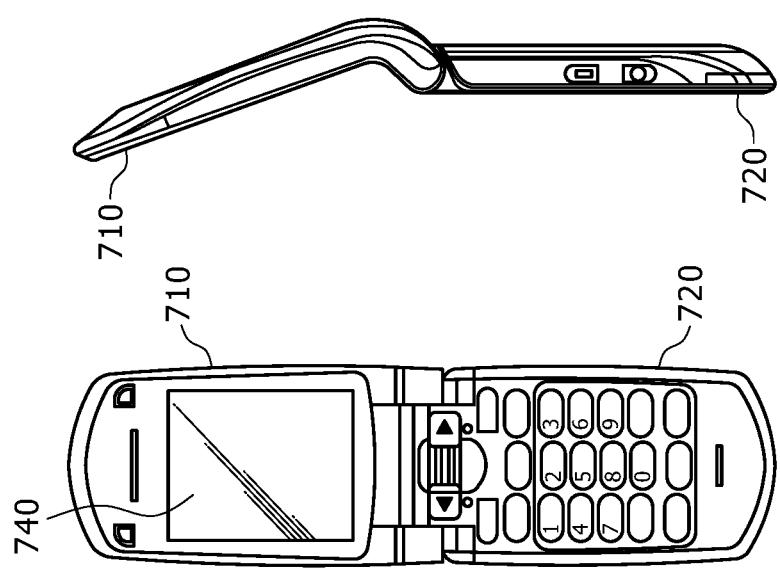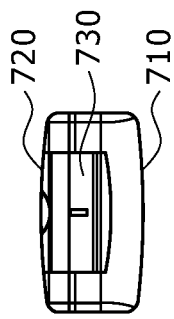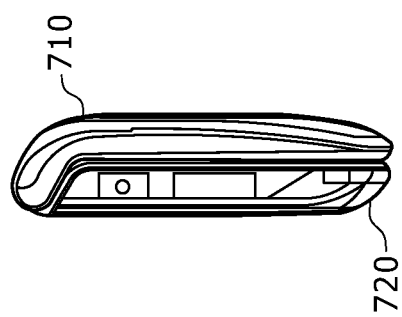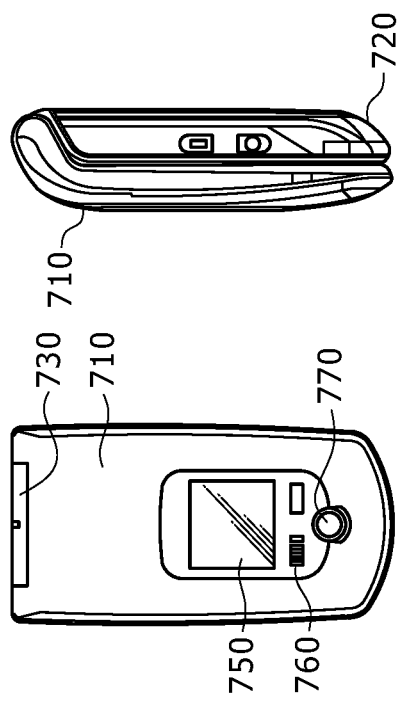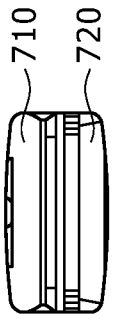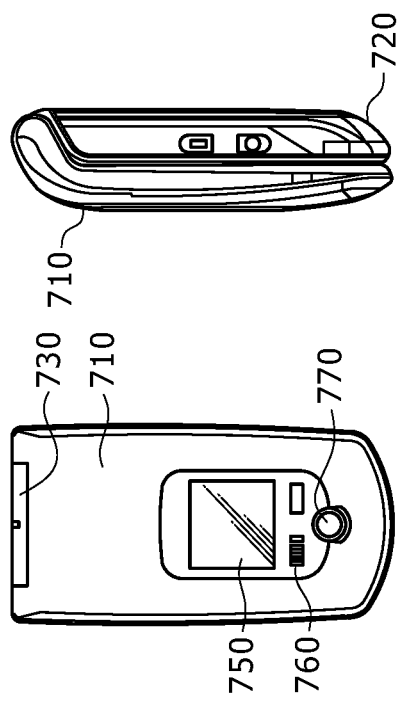

LIQUID CRYSTAL DISPLAY DEVICE

CROSS REFERENCES TO RELATED APPLICATIONS

The present application is a continuation of U.S. patent application Ser. No. 15/459,834, filed on Mar. 15, 2017, which application is a continuation application of U.S. patent application Ser. No. 13/740,915, filed on Jan. 14, 2013, and issued as U.S. Pat. No. 9,638,961 on May 2, 2017, which application claims priority to Japanese Priority Patent Application JP 2012-048708 filed in the Japan Patent Office on Mar. 6, 2012, the entire content of which is hereby incorporated by reference.

BACKGROUND

The present disclosure relates to a liquid crystal display device adapted to display an image, manufacturing method of the same and electronic equipment having the same.

There is a type of liquid crystal display device that includes an array substrate, opposed substrate and liquid layer. The array substrate has a transistor formed in each of a plurality of pixel regions that are arranged in a matrix form. The opposed substrate is arranged to be opposed to the array substrate. The liquid crystal layer is formed between the array and opposed substrates. Each of the pixel regions includes an opening region adapted to pass light and light-shielding region surrounding the opening region.

In such a liquid crystal display device, for example, an electric field based on image data is supplied to the liquid crystal layer from a pixel electrode and common electrode for each of the pixel regions, thus displaying a given image in each of the pixel region. This allows an image to be displayed, for example, on the outside of the opposed substrate.

In such a liquid crystal display device, a spacer is formed between the array and opposed substrates to create a space in which to form the liquid crystal layer. The spacer is fixed in position, for example, on the opposed substrate. Further, the spacer is arranged to coincide with the light-shielding region.

Here, if the array or opposed substrate bends due to an external force, the two substrates may be misaligned with each other horizontally (in the direction parallel to the substrate surface). In this case, the spacer may squeeze out into the opening region of the array substrate, possibly damaging, for example, the orientation film or other film and the element arranged in the opening region. This may result in leakage of light.

In contrast, a method is available to minimize the spacer from squeezing out of the light-shielding region in which the spacer is arranged by expanding the same region.

Japanese Patent Laid-Open No. 2000-206541 is referred.

SUMMARY

However, expanding the light-shielding region in which the spacer is arranged leads to a smaller opening region, thus making it difficult to use a liquid crystal display device adapted to display a high-definition image.

In light of the foregoing, it is desirable to provide a liquid crystal display device, manufacturing method of the same and electronic equipment having the same that provide reduced likelihood of the spacer damaging the film and element arranged in the opening region while at the same time securing an area for the opening region.

According to an embodiment of the present disclosure, there are provided a liquid crystal display device, manufacturing method of the same and electronic equipment having the same which will be described below.

The liquid crystal display device includes a first substrate, a second substrate, a liquid crystal layer, a first spacer section, and a second spacer section. The first substrate has a first surface. The first surface includes a light-shielding region in a lattice form and a plurality of opening regions surrounded by the light-shielding region. The light-shielding region includes a plurality of first extended portions extending in a first direction and a plurality of second extended portions extending in a second direction that intersects the first direction. The first substrate has a plurality of transistors formed thereon. The second substrate has a second surface that is opposed to and spaced from the first surface. The liquid crystal layer is arranged between the first and second surfaces. The first spacer section has long sides oriented in the second direction and is formed on one of the first or second surfaces, arranged at one of a plurality of intersections obtained as a result of each of the plurality of first extended portions intersecting one of the plurality of second extended portions, and protrudes into the liquid crystal layer. The second spacer section has long sides oriented in the first direction, is formed on the other of the first or second surfaces, arranged at the intersection where the first spacer section is arranged in such a manner as to intersect the first spacer section, and protrudes into the liquid crystal layer.

Further, the manufacturing method of the liquid crystal display device includes forming, on a first surface of a first substrate, a first spacer section having long sides in such a manner as to be located at one of a plurality of intersections obtained as a result of each of a plurality of first extended portions intersecting one of a plurality of second extended portions and have the long sides oriented in a second direction, the first substrate having the first surface, the first surface including a light-shielding region in a lattice form and a plurality of opening regions surrounded by the light-shielding region, the light-shielding region including the plurality of first extended portions extending in a first direction and the plurality of second extended portions extending in the second direction that intersects the first direction, the first substrate having a plurality of transistors formed thereon. The method further includes forming a second spacer section having long sides on a second surface of a second substrate, arranging the first and second substrates in such a manner that the first and second surfaces are opposed to and spaced from each other, that the second spacer section is arranged at the intersection where the first spacer section is arranged, that the second spacer section has long sides oriented in the first direction, and that the second spacer section intersects the first spacer section, and forming a liquid crystal layer between the first and second surfaces.

Still further, the electronic equipment includes a liquid crystal display device configured to display an image. The liquid crystal display device has a first substrate, a second substrate, a liquid crystal layer, a first spacer section, and a second spacer section. The first substrate has a first surface. The first surface includes a light-shielding region in a lattice form and a plurality of opening regions surrounded by the light-shielding region. The light-shielding region includes a plurality of first extended portions extending in a first direction and a plurality of second extended portions extending in a second direction that intersects the first direction. The first substrate has a plurality of transistors formed thereon. The second substrate has a second surface that is opposed to and spaced from the first surface. The liquid crystal layer is arranged between the first and second surfaces. The first spacer section has long sides oriented in the second direction and is formed on one of the first or second surfaces, arranged at one of a plurality of intersections obtained as a result of each of the plurality of first extended portions intersecting one of the plurality of second extended portions, and protrudes into the liquid crystal layer. The second spacer section has long sides oriented in the first direction, is formed on the other of the first or second surfaces, arranged at the intersection where the first spacer section is arranged in such a manner as to intersect the first spacer section, and protrudes into the liquid crystal layer.

The liquid crystal display device, manufacturing method of the same and electronic equipment provide reduced likelihood of the spacer damaging the film and element arranged in the opening region while at the same time securing an area for the opening region.

Additional features and advantages are described herein, and will be apparent from the following Detailed Description and the figures.

BRIEF DESCRIPTION OF THE FIGURES

FIGS. 6A to 6D are diagrams illustrating an example of a manufacturing method of the liquid crystal display device according to the second embodiment;

FIGS. 19A to 19G are diagrams illustrating an example of appearance of a mobile phone to which the liquid crystal display device is applied.

DETAILED DESCRIPTION

A description will be given below of the preferred embodiments with reference to the accompanying drawings.

First Embodiment

Figure 1A:
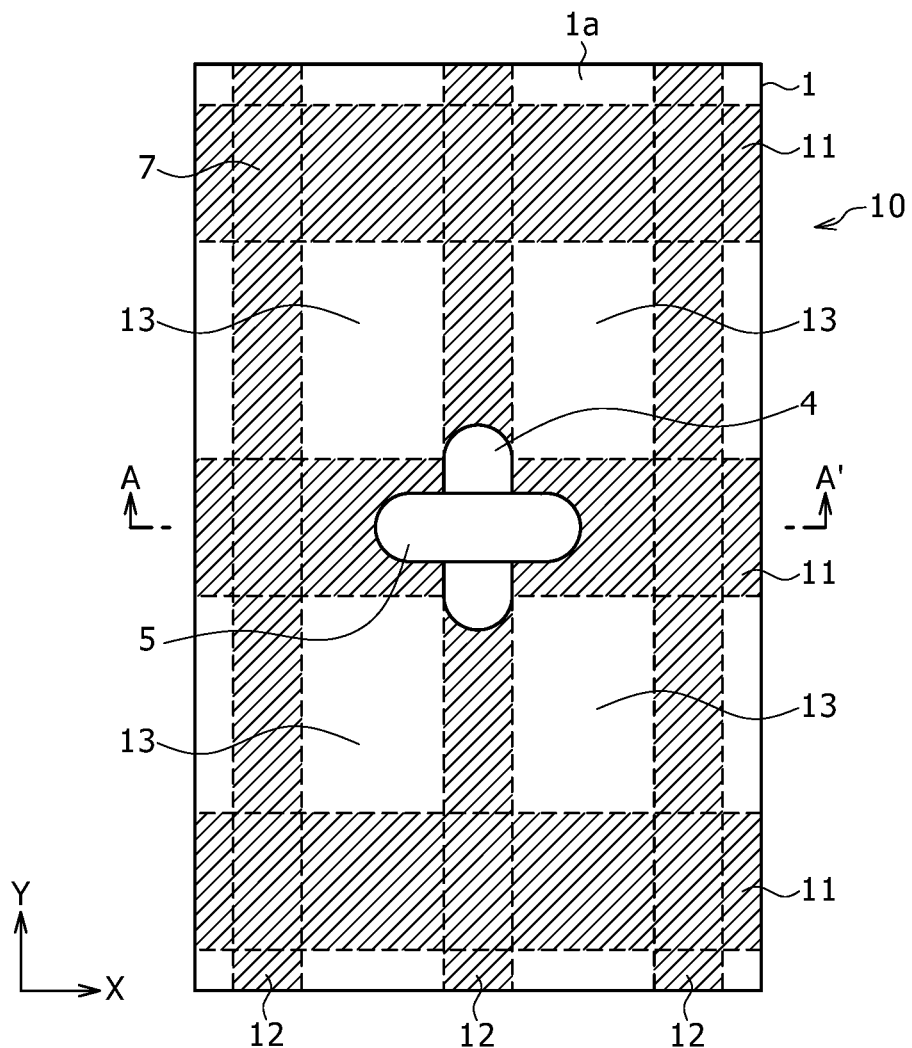
FIGS. 1A and 1B are diagrams illustrating an example of a liquid crystal display device according to a first embodiment.
Figure 1B:
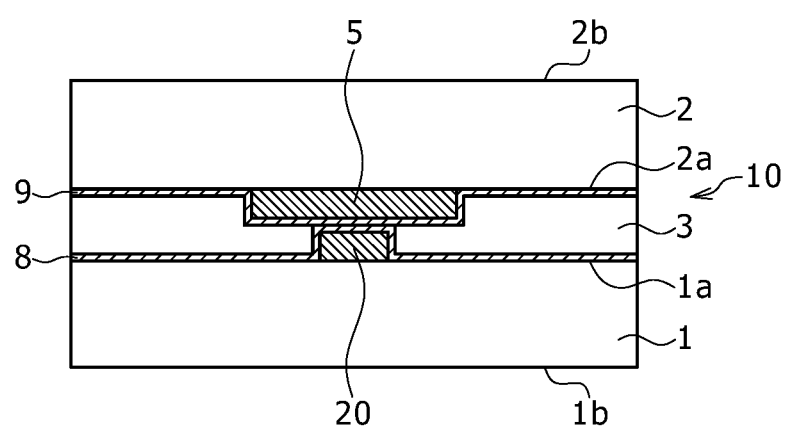

FIGS. 1A and 1B are diagrams illustrating an example of a liquid crystal display device according to a first embodiment. FIG. 1A illustrates a top view of a liquid crystal display device 10, and FIG. 1B a cross-sectional view along line A-A' in FIG. 1A. It should be noted that the top view of FIG. 1A does not show an opposed substrate 2 and liquid crystal layer 3.

The liquid crystal display device 10 includes an array substrate 1, opposed substrate 2, liquid crystal layer 3, spacer sections 4 and 5 and orientation films 8 and 9.

The array substrate 1 has, for example, a plurality of pixel regions that are arranged in a matrix form. TFTs (Thin Film Transistors) and pixel electrodes are formed in each of the pixel regions. A transparent glass substrate, for example, is used as the array substrate 1.

Further, the array substrate 1 has a surface 1a and a surface 1b on the opposite side of the surface 1a. The surface 1a includes a light-shielding region 7 in a lattice form. The light-shielding region 7 includes a plurality of extended portions 11 extending in the X direction and a plurality of extended portions 12 extending in the Y direction. The X and Y directions are, for example, orthogonal to each other.

Here, the light-shielding region 7 overlaps a light-shielding film (e.g., black matrix) or a light-shielding interconnect pattern such as gate and source lines formed on the array substrate 1 or opposed substrate 2. It should be noted that the light-shielding film is not shown.

Further, the surface 1a has a plurality of opening regions 13 each of which is surrounded by the light-shielding region 7. That is, each of the opening regions 13 is exposed from the light-shielding interconnect pattern such as a light-shielding film, gate lines or source lines formed on the array substrate 1 or opposed substrate 2. Here, each of the opening regions 13 is associated with one of the pixel regions.

A color filter and common electrode are, for example, formed on the opposed substrate 2. A transparent glass substrate, for example, is used as the opposed substrate 2. Further, the opposed substrate 2 has a surface 2a and a surface 2b on the opposite side of the surface 2a. The opposed substrate 2 is arranged in such a manner that the surface 2a is opposed to and spaced from the surface 1a of the array substrate 1.

The liquid crystal layer 3 is arranged between the surface 1a of the array substrate 1 and the surface 2a of the opposed substrate 2. Here, an electric field based on image data is supplied to the liquid crystal layer 3 from a pixel electrode and common electrode for each of the pixel regions in the liquid crystal display device 10. This changes the orientation of liquid crystal molecules based on the supplied electric field for each of the pixel regions.

In this condition, light from a backlight arranged on the side of the surface 1b of the array substrate 1 enters the liquid crystal display device 10 via a polarizing plate, passes through the liquid crystal layer 3 and leaves the liquid crystal display device 10 from the surface 2b of the opposed substrate 2 via a polarizing plate, thus allowing a given image to be displayed on the surface 2b.

The spacer section 4 is in a shape having long sides such as elliptical or rectangular shape. Also, the spacer section 4 is formed on the surface 1a of the array substrate 1 or the surface 2a of the opposed substrate 2 in such a manner as to protrude into the liquid crystal layer 3. In FIGS. 1A and 1B, the spacer section 4 is formed on the surface 1a of the array substrate 1. Further, the spacer section 4 has its long sides oriented in the Y direction and is arranged at one of a plurality of intersections obtained as a result of each of the plurality of extended portions 11 intersecting one of the plurality of extended portions 12. It should be noted that an orientation film 8 is formed on the surface 1a of the array substrate 1 to cover the spacer section 4.

The spacer section 5 is in a shape having long sides such as elliptical or rectangular shape. Also, the spacer section 5 is formed on the surface 1a of the array substrate 1 or the surface 2a of the opposed substrate 2 in such a manner as to protrude into the liquid crystal layer 3. In FIGS. 1A and 1B, the spacer section 5 is formed on the surface 2a of the opposed substrate 2.

Further, the spacer section 5 has its long sides oriented in the X direction and is arranged at the intersection where the spacer section 4 is arranged in such a manner as to intersect the spacer section 4. That is, the spacer sections 4 and 5 intersect as seen in the vertical direction (direction perpendicular to the surfaces 1a and 2a). It should be noted that the orientation film 9 is formed on the surface 2a of the opposed substrate 2 to cover the spacer section 5.

This ensures that the gap between the surface 1a of the array substrate 1 and the surface 2a of the opposed substrate 2 is maintained constant by the spacer sections 4 and 5.

As described above, the spacer sections 4 and 5 are formed respectively on the array substrate 1 and opposed substrate 2 of the liquid crystal display device 10. Further, the spacer section 4 has its long sides oriented in the Y direction and is arranged at one of the plurality of intersections obtained as a result of each of the plurality of extended portions 11 intersecting one of the plurality of extended portions 12. The spacer section 5 has its long sides oriented in the X direction and is arranged at the intersection where the spacer section 4 is arranged in such a manner as to intersect the spacer section 4.

This configuration ensures overlapping of the spacer sections 4 and 5 even if the array substrate 1 and opposed substrate 2 are horizontally (that is, in a direction parallel to the surfaces 1a and 2a) misaligned due to bending of either of the substrates by an external force. As a result, it is possible to provide reduced likelihood of the spacer section formed on the opposed substrate 2 touching and damaging the film such as orientation film and the element arranged in the opening region 13.

Further, this configuration contributes to reduced likelihood of the spacer formed on the opposed substrate 2 damaging the film and element arranged in the opening region 13 without widening the width (length along the Y direction) of the extended portions 11 of the light-shielding region 7 and the width (length along the X direction) of the extended portions 12 of the light-shielding region 7. That is, it is possible to provide reduced likelihood of the spacer damaging the film and element arranged in the opening region 13 while at the same time securing an area for the opening region 13.

Figure 2:
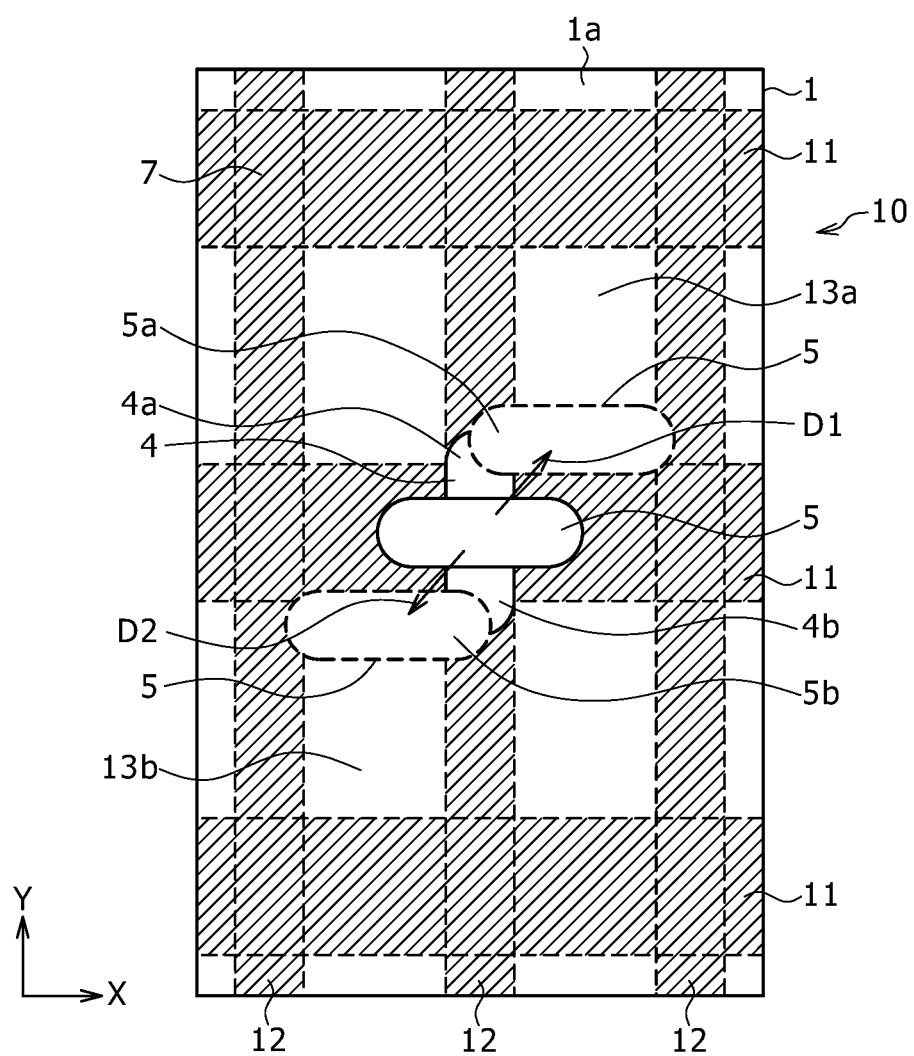
FIG. 2 is a top view illustrating an array substrate and opposed substrate that are out of alignment with each other in the liquid crystal display device according to the first embodiment.

FIG. 2 is a top view illustrating the array substrate and opposed substrate that are out of alignment with each other in the liquid crystal display device according to the first embodiment.

If, for example, the spacer section 5 is displaced in a diagonal direction D1 due to horizontal misalignment between the array substrate 1 and opposed substrate 2, the spacer section 5 partially overlaps an opening region 13a. However, an edge portion 5a of the spacer section 5 overlaps an edge portion 4a of the spacer section 4. That is, the spacer section 5 is supported by the spacer section 4 and does not touch the film or element arranged in the opening region 13a.

Further, if, for example, the spacer section 5 is displaced in a diagonal direction D2, the spacer section 5 partially overlaps an opening region 13b. However, an edge portion 5b of the spacer section 5 overlaps an edge portion 4b of the spacer section 4. That is, the spacer section 5 is supported by the spacer section 4 and does not touch the film or element arranged in the opening region 13a.

Second Embodiment

A description will be given next of a second embodiment.

Figure 3:
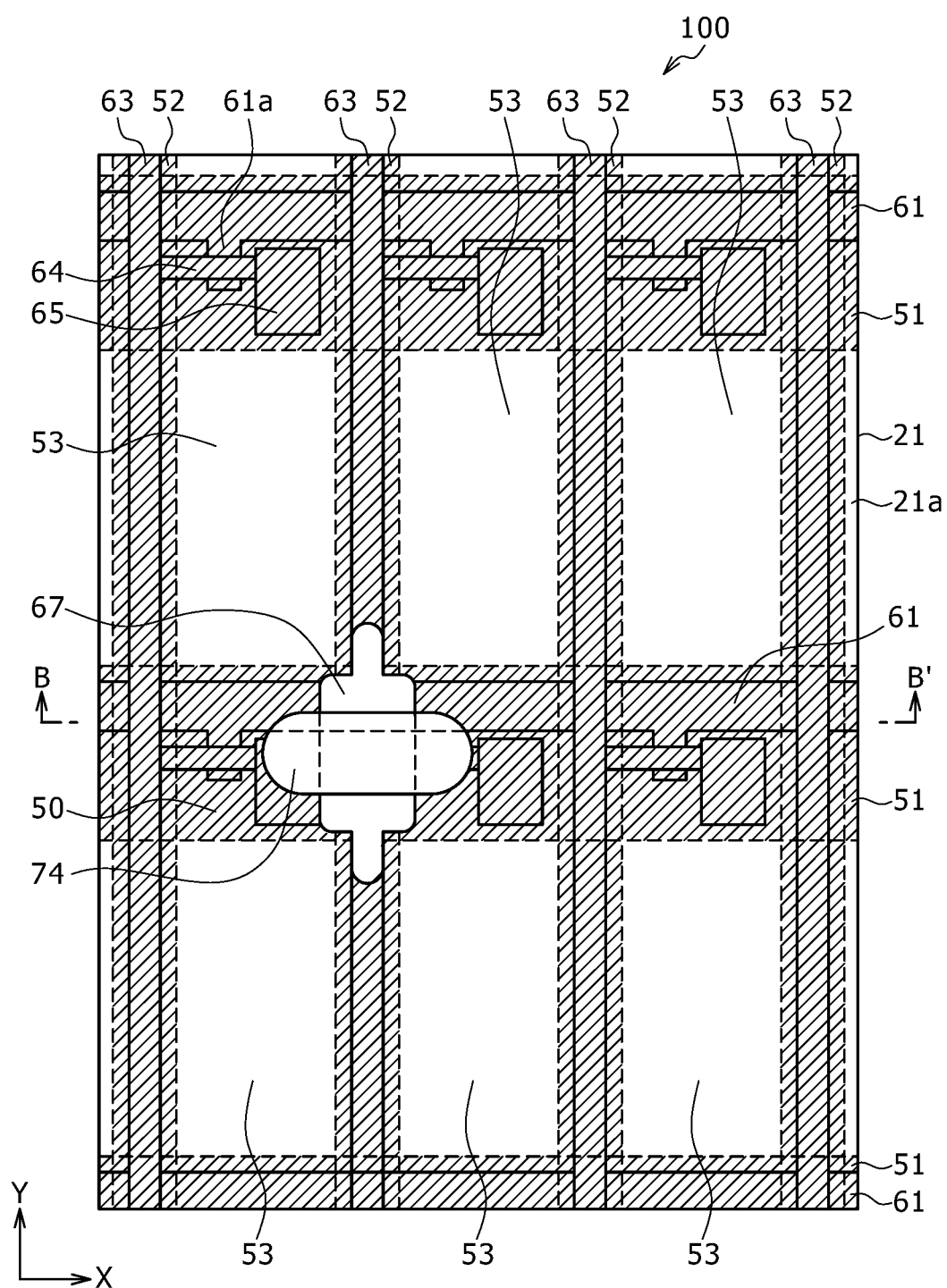
FIG. 3 is a top view illustrating a liquid crystal display device according to a second embodiment.
Figure 4:
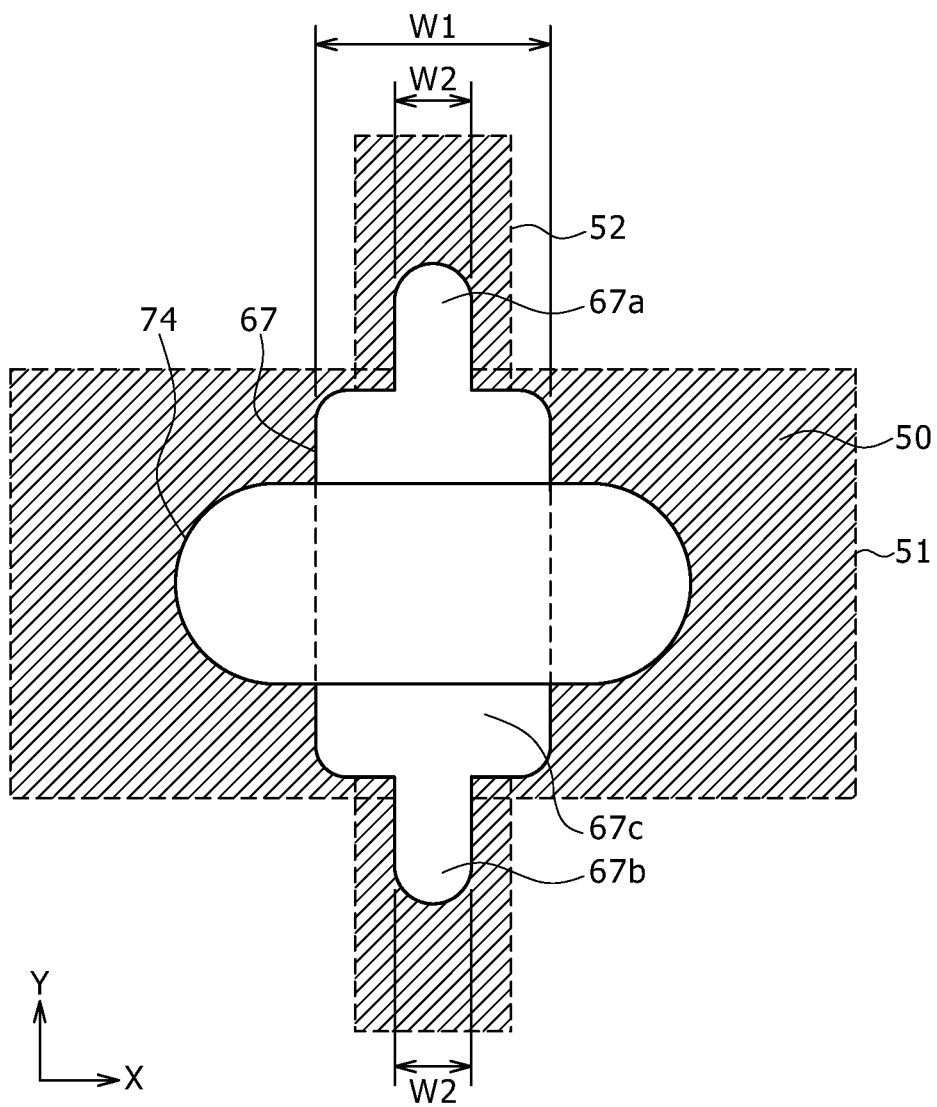
FIG. 4 is a partially enlarged view of spacer sections and their surrounding areas.
Figure 5:
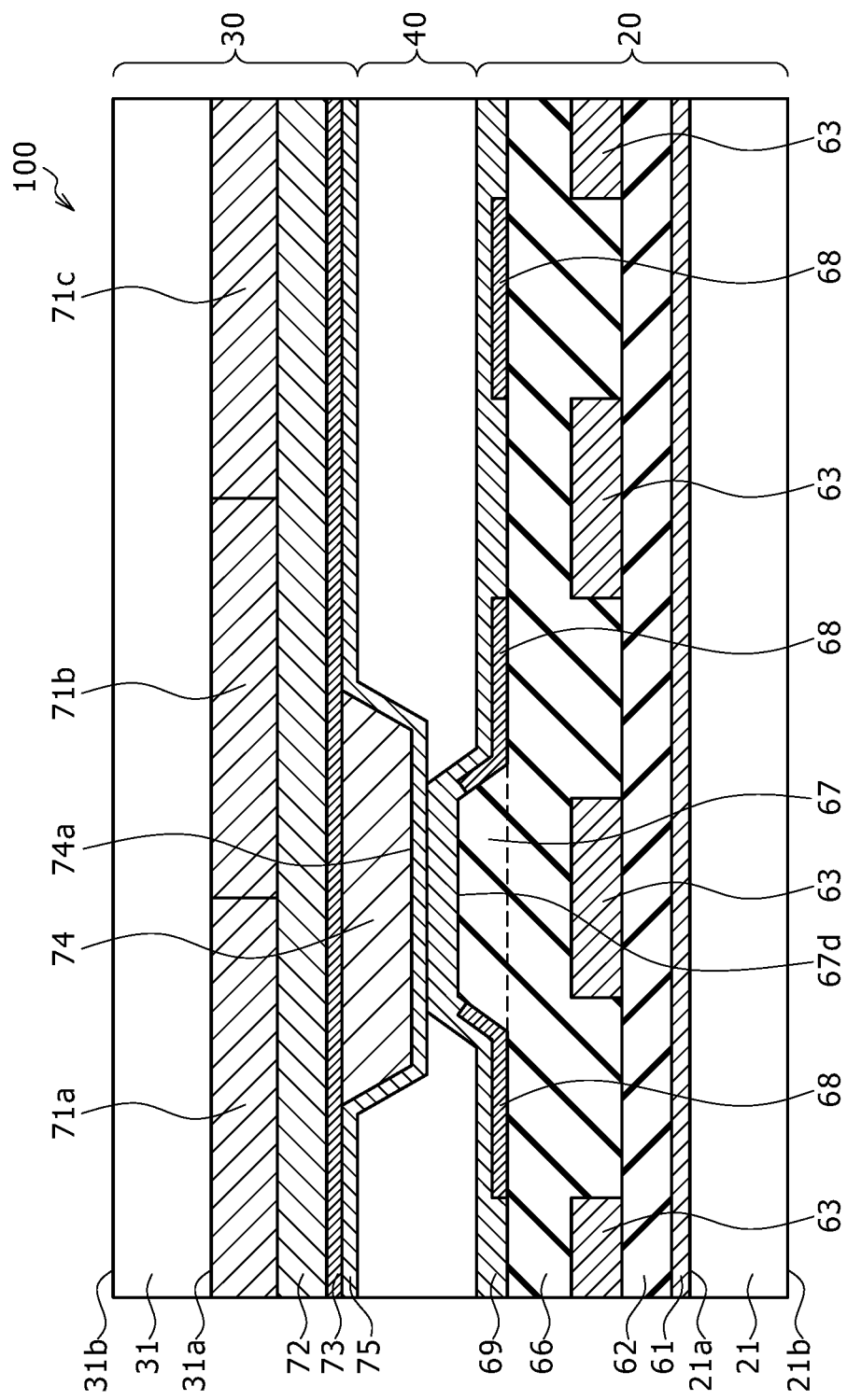
FIG. 5 is a cross-sectional view along line B-B' in FIG. 3.

FIG. 3 is a top view illustrating a liquid crystal display device according to the second embodiment. FIG. 4 is a partially enlarged view of the spacer sections and their surrounding areas. FIG. 5 is a cross-sectional view along line B-B' in FIG. 3. It should be noted that not only the components of an opposed substrate 30 other than a spacer section 74 but also a pixel electrode 68 are not shown in FIG. 3.

A liquid crystal display device 100 includes an array substrate 20, opposed substrate 30 and liquid crystal layer 40. A pixel electrode 68 is formed on the array substrate 20, and a common electrode 73 on the opposed substrate 30 in the liquid crystal display device 100. Among such liquid crystal display devices are TN (Twisted Nematic) mode, VA (Vertical Alignment) mode and ECB (Electrically Controlled Birefringence) mode liquid crystal display devices.

A description will be given first of the array substrate 20.

The array substrate 20 includes a transparent substrate 21 having a surface 21a and a surface 21b on the opposite side of the surface 21a. A glass substrate, for example, is used as the transparent substrate 21. The surface 21a includes a light-shielding region 50 in a lattice form. The light-shielding region 50 includes a plurality of extended portions 51 extending in the X direction and a plurality of extended portions 52 extending in the Y direction. It should be noted that the X and Y directions are orthogonal to each other.

Here, the light-shielding region 50 overlaps a light-shielding film (e.g., black matrix) or a light-shielding interconnect pattern such as gate lines 61 and source lines 63 formed on the array substrate 20 or opposed substrate 30. It should be noted that the light-shielding film is not shown. Further, the width (length in the Y direction) of the extended portions 51 of the light-shielding region 50 is greater than that (length in the X direction) of the extended portions 52 of the light-shielding region 50. It should be noted that a polarizing plate and backlight are arranged on the side of the surface 21b.

Still further, the surface 21a has a plurality of opening regions 53 each of which is surrounded by the light-shielding region 50. That is, each of the opening regions 53 is exposed from the light-shielding interconnect pattern such as a light-shielding film, the gate lines 61 or source lines 63 formed on the array substrate 20 or opposed substrate 30.

The plurality of gate lines 61 are formed on the surface 21a of the transparent substrate 21, each in such a manner as to extend in the X direction and overlap one of the extended portions 51 of the light-shielding region 50. A metal film, for example, is used as each of the gate lines 61. Further, an interlayer insulating film 62 is formed above the surface 21a to cover the gate lines 61. Still further, the plurality of source lines 63 are formed on the interlayer insulating film 62, each in such a manner as to extend in the Y direction and overlap one of the extended portions 52 of the light-shielding region 50. A metal film, for example, is used as each of the source lines 63.

It should be noted that each of the regions surrounded by the two adjacent gate lines 61 and two adjacent source lines 63 on the surface 21a corresponds to a pixel region. A transistor including a gate electrode 61a, semiconductor layer 64 and drain electrode 65 is formed in each of the pixel regions.

The semiconductor layer 64 has its one end connected to the drain electrode 65 and its other end connected to the source line 63. Further, the gate electrode 61a is arranged in such a manner as to overlap the semiconductor layer 64 with a gate insulating film provided therebetween. The same electrode 61a is connected to the gate line 61. That is, this transistor controls the passage of current between the source line 63 and drain electrode 65 based on the voltage supplied to the gate line 61.

Further, an organic insulating film 66 is formed on the interlayer insulating film 62 to cover the source lines 63. Here, part of the organic insulating film 66 protrudes in the direction away from the surface 21a of the transparent substrate 21. This protruding portion forms a spacer section 67. The spacer section 67 protrudes 0.2 μm or more into the opening regions 53.

The spacer section 67 is in a shape having long sides. Further, the spacer section 67 is arranged at one of the plurality of intersections obtained as a result of each of the plurality of extended portions 51 intersecting one of the plurality of extended portions 52 in such a manner as to have its long sides oriented in the Y direction. It should be noted that the plurality of spacer sections 67 may be formed. In this case, the spacer sections 67 are arranged at some of the plurality of intersections rather than all thereof.

Further, the spacer section 67 has edge portions 67a and 67b and an intermediate portion 67c provided between the edge portions 67a and 67b. The edge portions 67a and 67b are arranged to overlap one of the extended portions 52 of the light-shielding region 50. The intermediate portion 67c is arranged to overlap one of the extended portions 51. Here, a width W1 of the intermediate portion 67c is greater than a width W2 of the edge portions 67a and 67b.

Still further, a plurality of pixel electrodes 68 are formed on the organic insulating film 66 to expose a top surface 67d of the spacer section 67. Each of the pixel electrodes 68 is connected to one of the drain electrodes 65. A transparent electrode made, for example, of ITO (Indium Tin Oxide) or IZO (Indium Zinc Oxide) is used as the pixel electrode 68. Further, an orientation film 69 is formed on the organic insulating film 66 to cover the top surface 67d of the spacer section 67 and the pixel electrodes 68.

A description will be given next of the opposed substrate 30.

The opposed substrate 30 includes a transparent substrate 31 having a surface 31a and a surface 31b on the opposite side of the surface 31a. A glass substrate, for example, is used as the transparent substrate 31. The transparent substrate 31 is arranged in such a manner that the surface 31a is opposed to the surface 21a of the transparent substrate 21. It should be noted that a polarizing plate is arranged on the side of the surface 31b.

Color filters 71a, 71b and 71c are formed on the surface 31a of the transparent substrate 31. For example, the color filters 71a, 71b and 71c are red, blue and green color filters, respectively. The color filters 71a, 71b and 71c are provided for each of the pixel regions.

Further, an overcoat layer 72 is formed on the color filters 71a, 71b and 71c. Still further, the common electrode 73 is formed on the overcoat layer 72. A transparent electrode made, for example, of ITO or IZO is used as the common electrode 73.

Still further, the spacer section 74 is formed on the common electrode 73. The same section 74 is made, for example, of an acrylic resin. On the other hand, the spacer section 74 is in an elliptical shape. It should be noted that the spacer section 74 may be in a rectangular shape rather than an elliptical shape.

Then, the spacer section 74 has its long sides oriented in the X direction and is arranged at the intersection of the light-shielding region 50 where the spacer section 67 of the array substrate 20 is arranged in such a manner as to intersect the spacer section 67. That is, the spacer sections 67 and 74 intersect as seen in the vertical direction (direction perpendicular to the surface 21a of the transparent substrate 21 and the surface 31a of the transparent substrate 31). Further, the spacer section 74 is arranged to overlap one of the extended portions 51 of the light-shielding region 50. This ensures that the gap between the array substrate 20 and opposed substrate 30 is maintained constant by the spacer sections 67 and 74.

Further, an orientation film 75 is formed above the overcoat layer 72 to cover the common electrode 73 and spacer section 74. Here, the orientation film 75 covering a top surface 74a of the spacer section 74 and the orientation film 69 covering the top surface 67d of the spacer section 67 of the array substrate 20 are in contact with each other.

A description will be given next of the liquid crystal layer 40.

The liquid crystal layer 40 is formed between the orientation film 69 of the array substrate 20 and the orientation film 75 of the opposed substrate 30. Here, the spacer section 67 of the array substrate 20 and the spacer section 74 of the opposed substrate 30 are formed to protrude into the liquid crystal layer 40.

A description will be given next of the operation of the liquid crystal display device 100 adapted to display an image.

In the liquid crystal display device 100, for example, a control signal is supplied to the gate lines 61, and a data signal to the source lines 63, thus allowing an electric field based on image data to be supplied to the liquid crystal layer 40 from the pixel electrode 68 and common electrode 73 for each of the pixel regions. This changes the orientation of liquid crystal molecules based on the supplied electric field for each of the pixel regions.

In this condition, light from a backlight arranged on the side of the surface 21b of the transparent substrate 21 enters the liquid crystal display device 100 via a polarizing plate, passes through the liquid crystal layer 40 and leaves the liquid crystal display device 100 from the surface 31b of the transparent substrate 31 via a polarizing plate, thus allowing a given color image to be displayed on the surface 31b.

A description will be given next of the manufacturing method of the liquid crystal display device 100.

FIGS. 6A to 6D are diagrams illustrating an example of the manufacturing method of the liquid crystal display device according to the second embodiment.

Figure 6A:
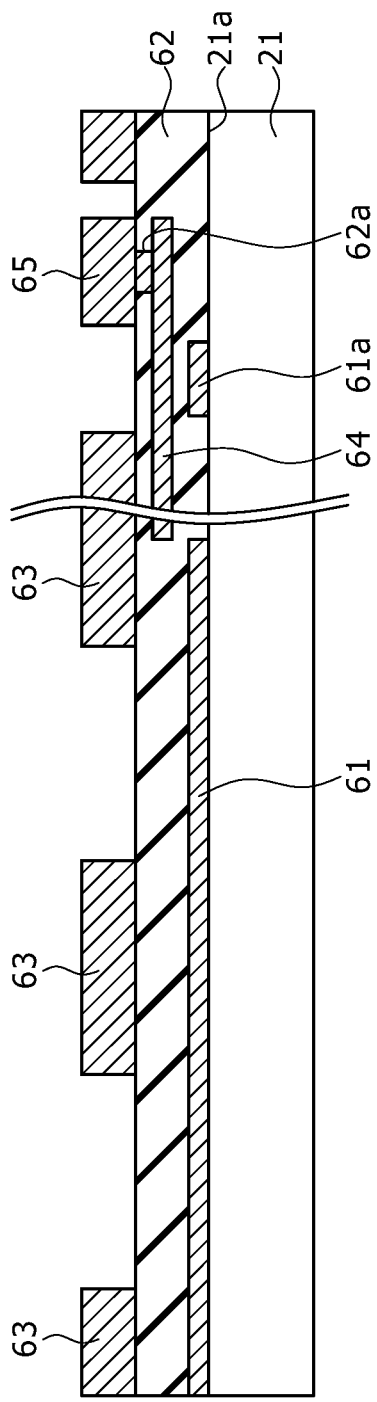

First, as illustrated in FIG. 6A, the gate lines 61, gate electrodes 61a, semiconductor layer 64 and interlayer insulating film 62 are formed on the surface 21a of the transparent substrate 21, followed by the formation of the source lines 63 and drain electrodes 65 on the interlayer insulating film 62. Here, each of the drain electrodes 65 is connected to the semiconductor layer 64 via a contact hole 62a provided in the interlayer insulating film 62.

The gate lines 61, source lines 63 and drain electrodes 65 are formed, for example, by forming a metal film on the underlying layer by sputtering technique and then etching the metal film using a resist mask formed by photolithography technique.

Next, as illustrated in FIG. 6B, the organic insulating film 66 is formed on the interlayer insulating film 62 to cover the source lines 63 and drain electrodes 65. The organic insulating film 66 is formed, for example, by applying an organic material to the interlayer insulating film 62.

Next, as illustrated in FIG. 6C, the organic insulating film 66 is half-etched with a given region left unetched. More specifically, the organic insulating film 66 is half-exposed and developed with a given region left unexposed. The region left unetched serves as the spacer section 67. It should be noted that a contact hole 66a is provided at this time in the organic insulating film 66.

Figure 6D:
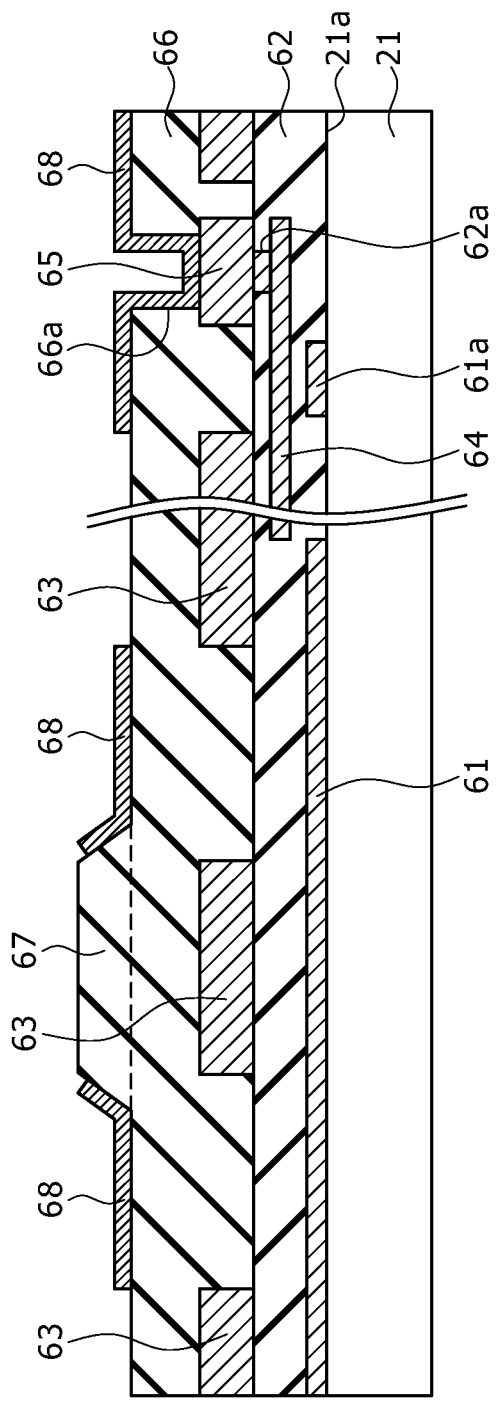

Next, as illustrated in FIG. 6D, the pixel electrodes 68 are formed. Here, each of the pixel electrodes 68 is connected to the drain electrode 65 via a contact hole 66a. The pixel electrodes 68 are formed, for example, by forming an ITO film on the organic insulating film 66 by sputtering technique, then etching the ITO film using a resist mask formed by photolithography technique, and finally thermally treating the etched film.

Then, the orientation film 69 is formed on the organic insulating film 66 in such a manner as to cover the pixel electrodes 68, thus forming the array substrate 20. Next, the opposed substrate 30 is arranged above the array substrate 20 in such a manner that the surface 21a of the transparent substrate 21 is opposed to the surface 31a of the transparent substrate 31 with a predetermined distance kept therebetween. Then, the liquid crystal layer 40 is formed between the array substrate 20 and opposed substrate 30, thus forming the liquid crystal display device 100.

As described above, the spacer sections 67 and 74 are formed respectively on the array substrate 20 and opposed substrate 30 in the liquid crystal display device 100. Further, the spacer section 67 has its long sides oriented in the Y direction and is arranged at one of the plurality of intersections obtained as a result of each of the plurality of extended portions 51 of the light-shielding region 50 intersecting one of the plurality of extended portions 52 of the light-shielding region 50. Still further, the spacer section 74 has its long sides oriented in the X direction and is arranged at the intersection of the light-shielding region 50 where the spacer section 67 is arranged in such a manner as to intersect the spacer section 67.

This configuration ensures overlapping of the spacer sections 67 and 74 even if the array substrate 20 and opposed substrate 30 are horizontally (in the direction parallel to the surfaces 21a and 31a) misaligned due to bending of either of the substrates by an external force. As a result, it is possible to provide reduced likelihood of the spacer section 74 touching and damaging the film such as orientation film 69 and the element arranged in the opening region 53.

Further, this configuration contributes to reduced likelihood of the spacer section 74 touching and damaging the film and element arranged in the opening region 53 without widening the width (length along the Y direction) of the extended portions 51 of the light-shielding region 50 and the width (length along the X direction) of the extended portions 52 of the light-shielding region 50. That is, it is possible to provide reduced likelihood of the spacer section 74 damaging the film and element arranged in the opening region 53 while at the same time securing an area for the opening region 53.

Figure 7:
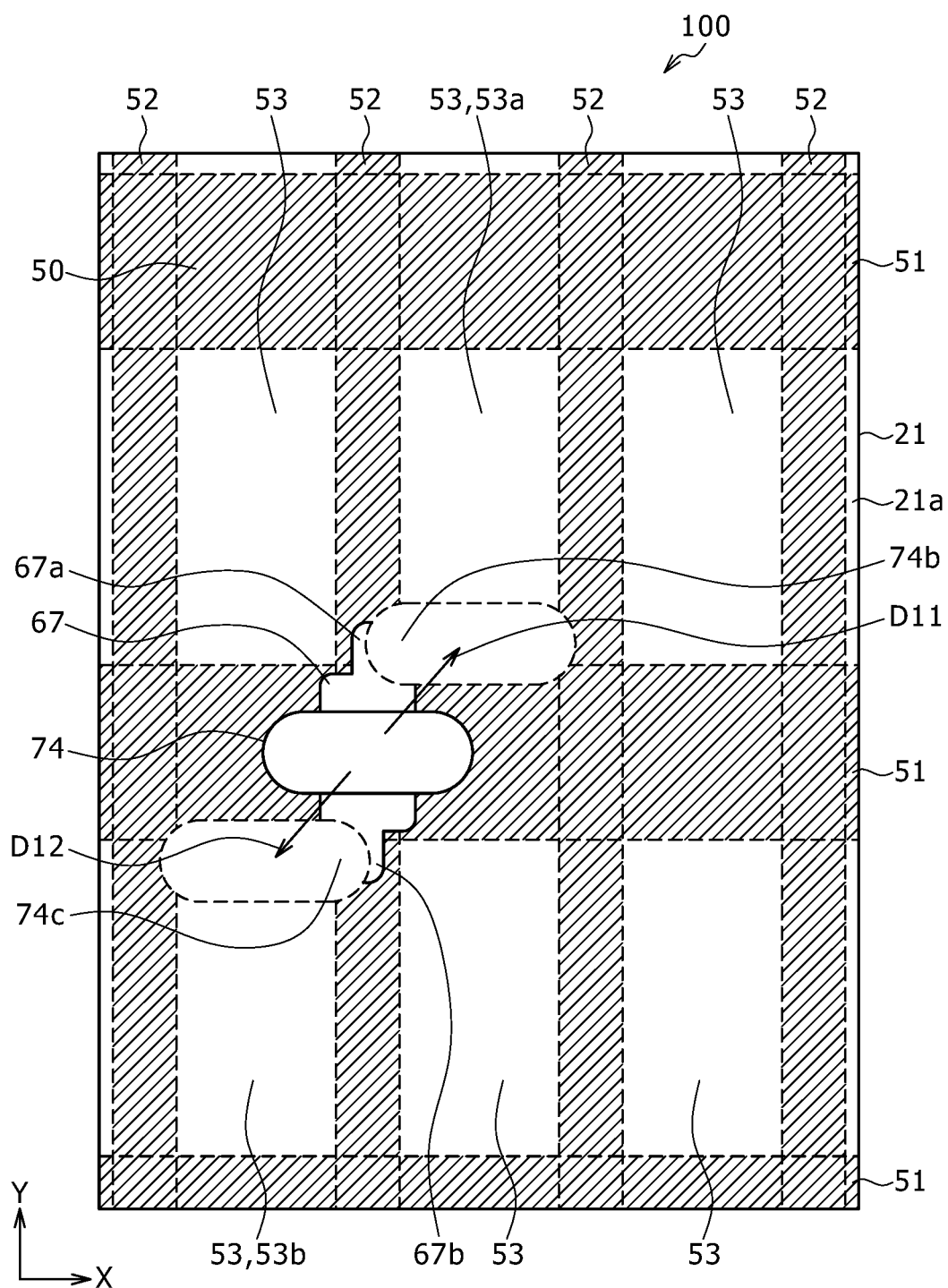
FIG. 7 is a top view illustrating the array substrate and opposed substrate that are out of alignment with each other in the liquid crystal display device according to the second embodiment.

FIG. 7 is a top view illustrating the array substrate and opposed substrate that are out of alignment with each other in the liquid crystal display device according to the second embodiment.

If, for example, the spacer section 74 is displaced in a diagonal direction D11 due to horizontal misalignment between the array substrate 20 and opposed substrate 30, the spacer section 74 partially overlaps an opening region 53a. However, an edge portion 74b of the spacer section 74 overlaps an edge portion 67a of the spacer section 67. That is, the spacer section 74 is supported by the spacer section 67 and does not touch the orientation film 69 arranged in the opening region 53a.

Further, if, for example, the spacer section 74 is displaced in a diagonal direction D12, the spacer section 74 partially overlaps an opening region 53b. However, an edge portion 74c of the spacer section 74 overlaps an edge portion 67b of the spacer section 67. That is, the spacer section 74 is supported by the spacer section 67 and does not touch the orientation film 69 arranged in the opening region 53b.

Still further, in the liquid crystal display device 100, the spacer section 67 having its long sides oriented in the Y direction extends in such a manner as to overlap the extended portion 52 that is narrower than the extended portion 51. As a result, it is necessary for the spacer section 67 to be more accurate in size and position than the spacer section 74 having its long sides oriented in the X direction.

In the liquid crystal display device 100, the spacer section 67 having its long sides oriented in the Y direction is formed on the side of the array substrate 20. The reduced projection and reset-and-repeat (stepper) photolithography process is used for the array substrate 20, thus allowing for micropatterning of the array substrate 20. This makes it possible to form the spacer section 67 with high accuracy in size and position without significantly changing the manufacturing steps.

It should be noted that the one-to-one projection and proximity exposure (one-shot exposure or mirror projection aligner) lithography process is used for the opposed substrate 30. For example, the line width and positional accuracy for the opposed substrate 30 is on the order of microns. In contrast, that for the array substrate 20 is on the order of submicrons.

In the liquid crystal display device 100, on the other hand, the spacer section 67 has the edge portions 67a and 67b and the intermediate portion 67c provided between the edge portions 67a and 67b. Further, the width W1 of the intermediate portion 67c is greater than the width W2 of the edge portions 67a and 67b. This configuration provides, for example, the spacer section 67 with more resistance to the pressure caused by the spacer section 67 being pressed by the spacer section 74 when a vertical force is applied to the opposed substrate 30.

Further, in the liquid crystal display device 100, the spacer section 67 includes part of the organic insulating film 66. That is, the spacer section 67 is made of the same material as the organic insulating film 66. This configuration makes it possible to form the spacer section 67 without using any new material, thus contributing to reduced cost of the liquid crystal display device 100.

Still further, in the liquid crystal display device 100, the spacer section 67 is formed by half-etching the organic insulating film 66 with a given region left unetched. This configuration makes it possible to form the spacer section 67 without significantly increasing the number of steps.

Modification Example 1

A description will be given next of a modification example of the second embodiment as modification example 1.

Figure 8:
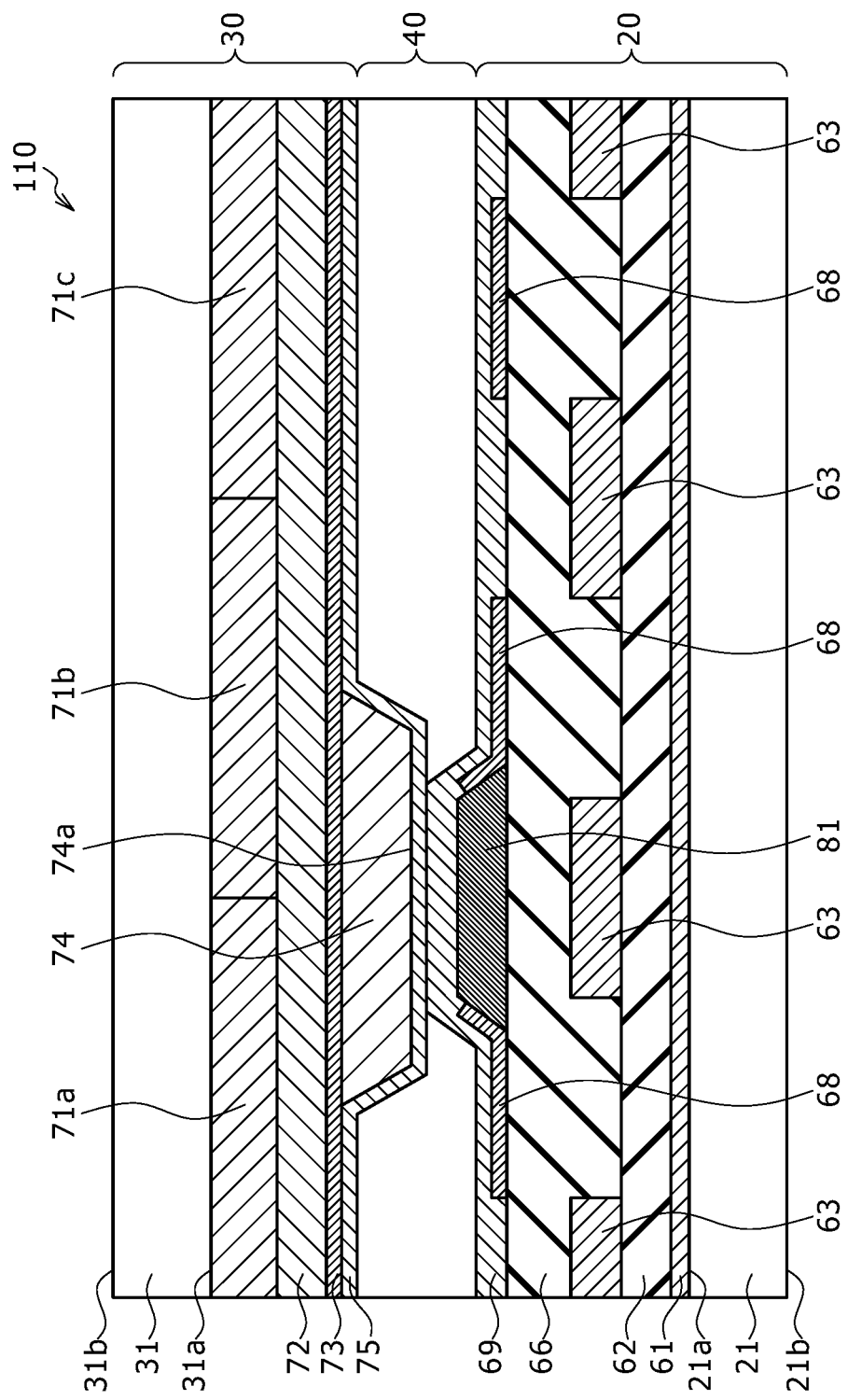
FIG. 8 is a cross-sectional view illustrating modification example 1.

FIG. 8 is a cross-sectional view illustrating modification example 1.

A liquid crystal display device 110 differs from the liquid crystal display device 100 in that a spacer section 81 is formed rather than the spacer section 67. The liquid crystal display device 110 is the same as the liquid crystal display device 100 in all the other respects. The spacer section 81 is made, for example, of an acrylic resin. It should be noted that the spacer section 81 is the same in shape and arrangement as the spacer section 67.

That is, the spacer section 67 is formed with part of the organic insulating film 66 in the liquid crystal display device 100. In contrast, the spacer section 81 is formed separately from the organic insulating film 66 in the liquid crystal display device 110. This configuration makes it possible, for example, to select a material more resistant to force as the spacer section 81.

Further, the liquid crystal display device 110 also provides reduced likelihood of the spacer section 74 damaging the film and element arranged in the opening region 53 while at the same time securing an area for the same region 53.

Third Embodiment

A description will be given next of a third embodiment.

Figure 9:
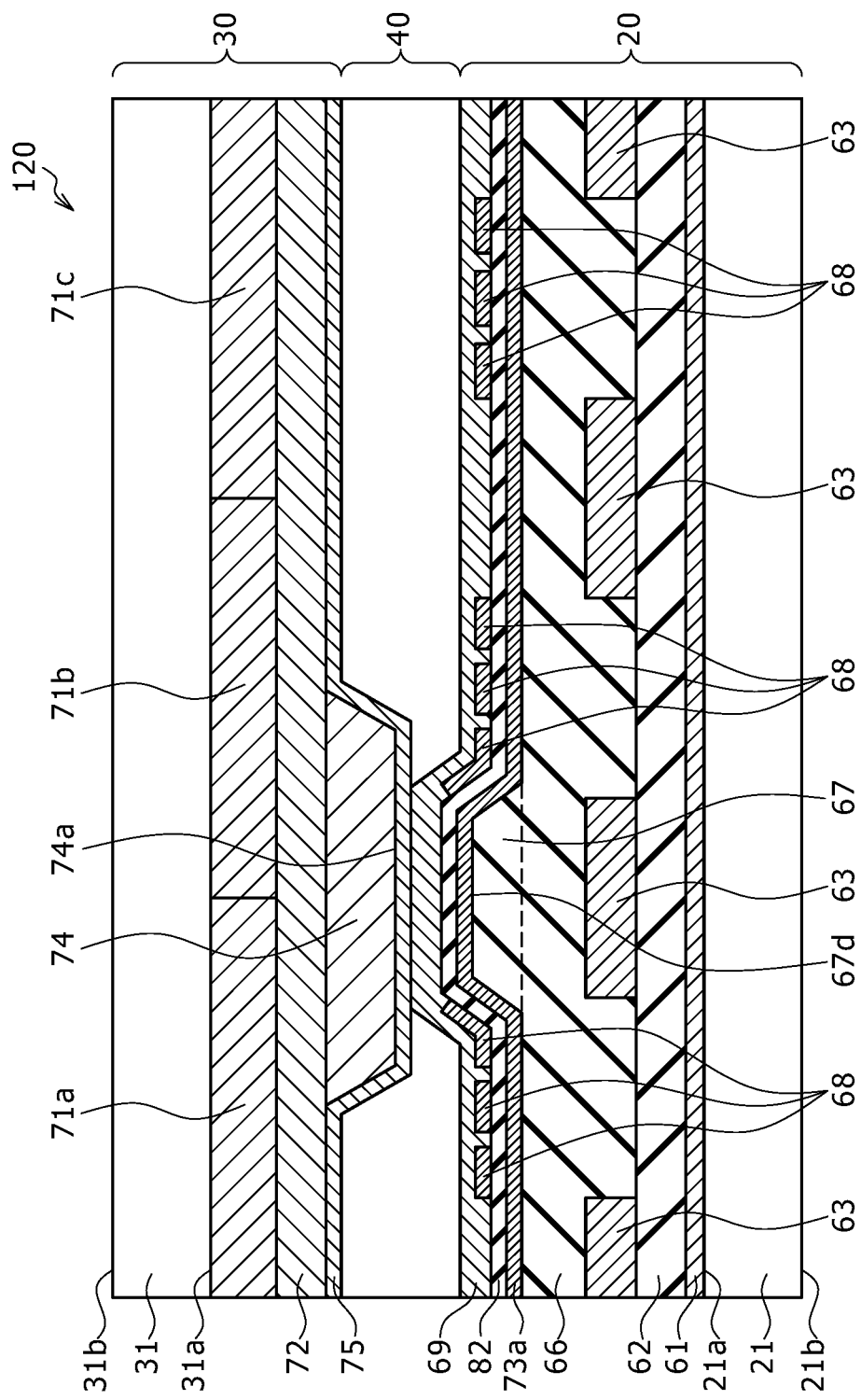
FIG. 9 is a cross-sectional view illustrating an example of a liquid crystal display device according to a third embodiment.

FIG. 9 is a cross-sectional view illustrating an example of a liquid crystal display device according to the third embodiment.

A liquid crystal display device 120 differs from the liquid crystal display device 100 according to the second embodiment in that a common electrode 73a is formed on the side of the array substrate 20 rather than the opposed substrate 30. In the liquid crystal display device 120, the common electrode 73a is formed on the organic insulating film 66 to cover the top surface 67d of the spacer section 67. It should be noted that among liquid crystal display devices having its common electrode formed on the side of the array substrate are FFS (Fringe Field Switching) mode liquid crystal display devices.

Further, an insulating film 82 is formed above the organic insulating film 66 to cover the common electrode 73a. An inorganic insulating film is used as the insulating film 82. Among inorganic insulating films are silicon oxide film ($SiO_2$) and silicon nitride films (SiN). Then, the pixel electrodes 68 are formed on the insulating film 82. Further, the orientation film 69 is formed to cover the pixel electrodes 68. It should be noted that the liquid crystal display device 120 is the same as the liquid crystal display device 100 in all the other respects.

The liquid crystal display device 120 also provides reduced likelihood of the spacer section 74 damaging the film and element arranged in the opening region 53 while at the same time securing an area for the opening region 53 as does the liquid crystal display device 100.

Modification Example 2

A description will be given next of a modification example of the third embodiment as modification example 2.

Figure 10:
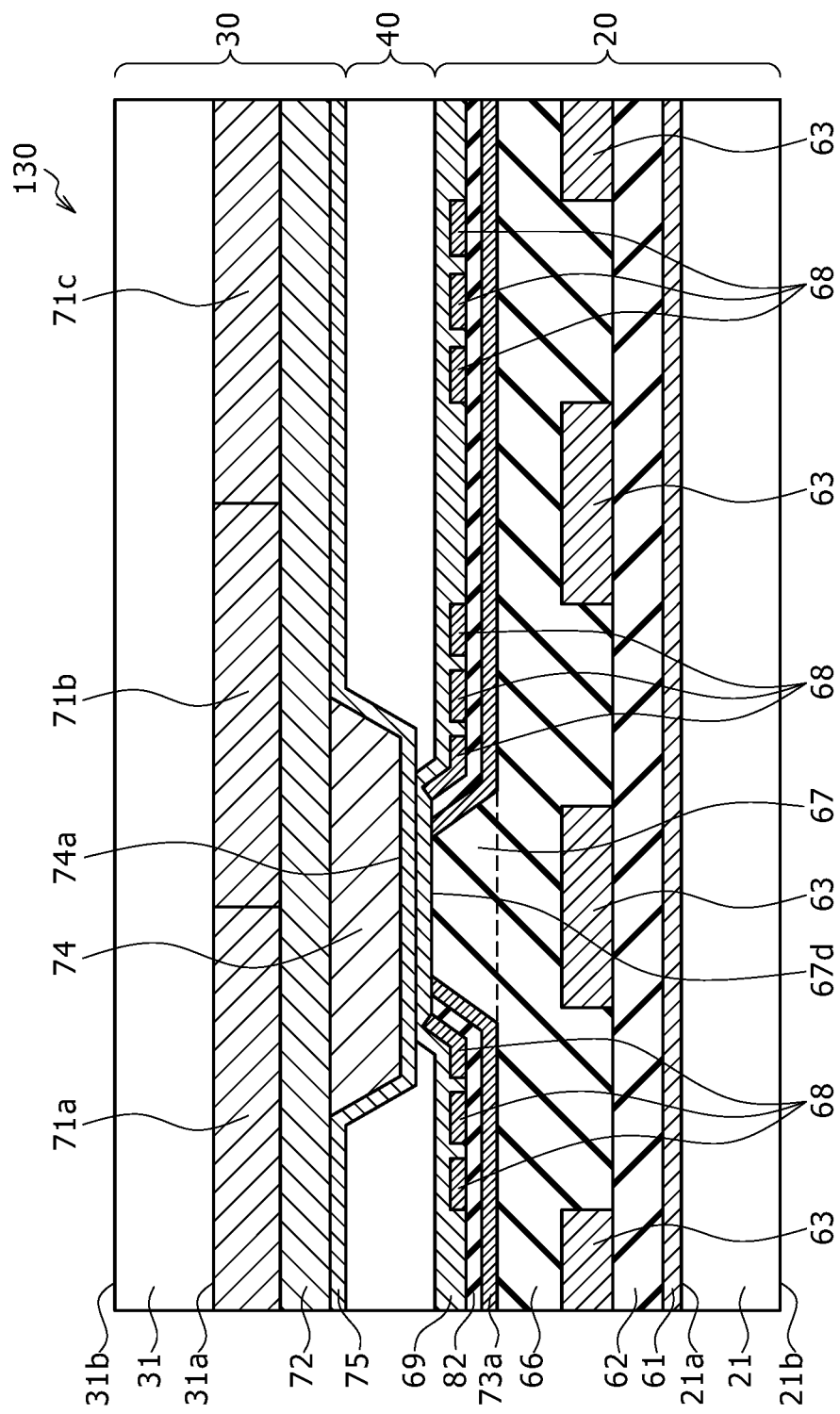
FIG. 10 is a cross-sectional view illustrating modification example 2.

FIG. 10 is a cross-sectional view illustrating modification example 2.

A liquid crystal display device 130 differs from the liquid crystal display device 120 in that the common electrode 73a and insulating film 82 are formed by exposing the top surface 67d of the spacer section 67. The liquid crystal display device 130 is the same as the liquid crystal display device 120 in all the other respects.

That is, in the liquid crystal display device 130, the common electrode 73a and insulating film 82 are not sandwiched by the spacer sections 67 and 74. This minimizes cracking of the insulating film 82 and damage to the common electrode 73a in the case that the spacer section 67 is pressed by the spacer section 74.

Further, the liquid crystal display device 130 also provides reduced likelihood of the spacer section 74 damaging the film and element arranged in the opening region 53 while at the same time securing an area for the opening region 53.

Fourth Embodiment

A description will be given next of a fourth embodiment.

Figure 11:
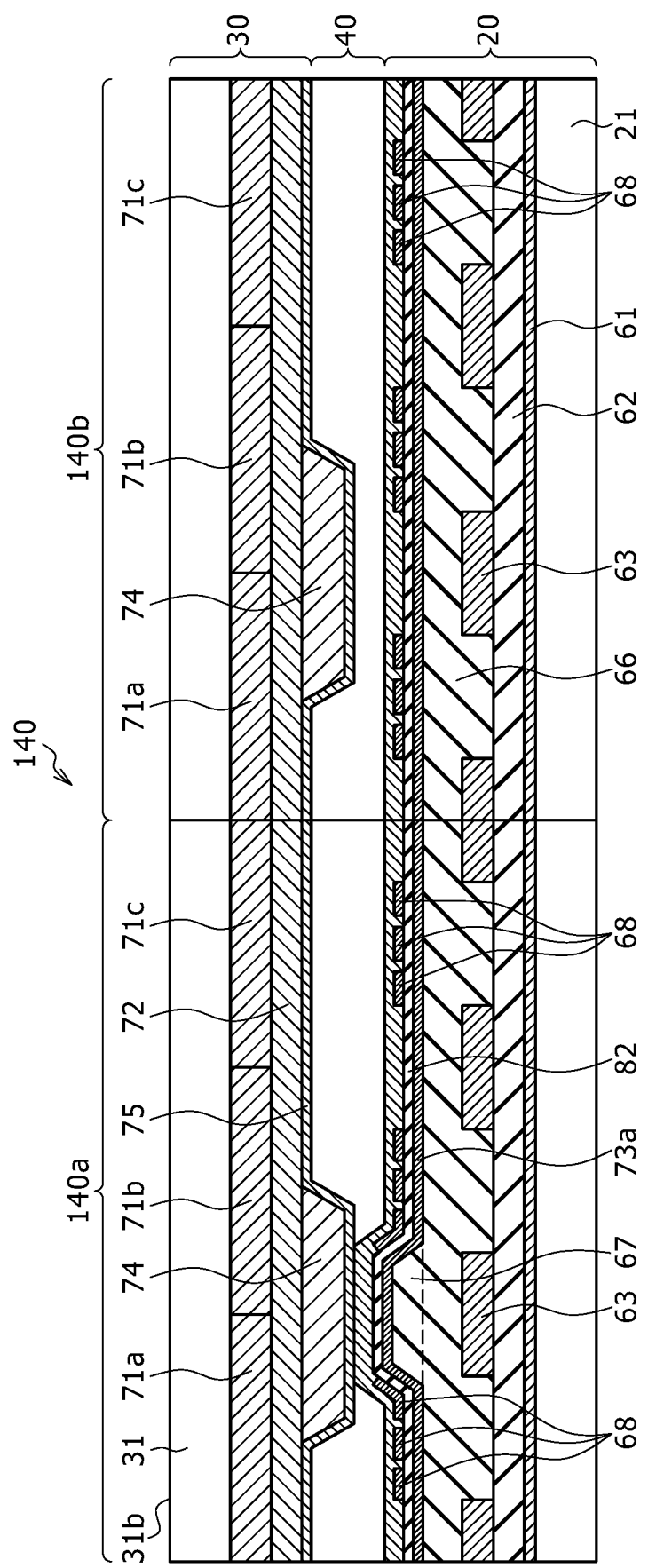
FIG. 11 is a cross-sectional view illustrating an example of a liquid crystal display device according to a fourth embodiment.

FIG. 11 is a cross-sectional view illustrating an example of a liquid crystal display device according to the fourth embodiment.

A liquid crystal display device 140 includes two sections, i.e., a section 140a that has the same structure as the liquid crystal display device 120 according to the third embodiment and a section 140b that has the same structure as the liquid crystal display device 120 except that the spacer section 67 is not formed.

That is, the liquid crystal display device 140 includes the two sections, i.e., the section 140a in which the spacer sections 67 and 74 are formed as a pair, and the section 140b in which only one of the spacer sections 67 and 74, namely, the spacer section 74, is formed. It should be noted that the section 140b may have only the spacer section 67 formed therein rather than the spacer section 74.

In other words, in the section 140a of the liquid crystal display device 140, the spacer section 74 rests on (is supported by) the spacer section 67. In the section 140b thereof, on the other hand, the spacer section 74 is left floating.

Here, when the liquid crystal display device 140 vibrates due to a sudden large force caused, for example, by a shock resulting from a fall, the following problem may arise if the space (gap) between the array substrate 20 and opposed substrate 30 is difficult to deform. That is, the gap is put under vacuum pressure, thus causing part of the liquid crystal layer 40 or the gases dissolved therein to evaporate and keeping air bubbles trapped therein.

In contrast, the section 140b of the liquid crystal display device 140 has the spacer section 74 floating. Therefore, if an external vertical force is suddenly applied, this force is concentrated on the spacer section 67 of the section 140a. This causes the spacer section 67 of the section 140a to elastically deform, thus causing the gap to deform with ease. As a result, it is possible to minimize air bubbles in the gap.

On the other hand, when a vertical force is statically applied to the liquid crystal display device 140 as when the surface 31b of the transparent substrate 31 is pressed with a finger, the spacer section 74 of the section 140b rests on the array substrate 20. This allows the vertical force to be distributed over the spacer section 67 of the section 140a and the spacer section 74 of the section 140b, thus minimizing the elastic deformation and crushing of the spacer section 67. As a result, it is possible to minimize inconsistent image display caused by crushing of the spacer section 67.

Further, the liquid crystal display device 140 also provides reduced likelihood of the spacer section 74 touching and damaging the film and element arranged in the opening region 53 while at the same time securing an area for the opening region 53.

Modification Example 3

A description will be given next of a modification example of the fourth embodiment as modification example 3.

Figure 12:
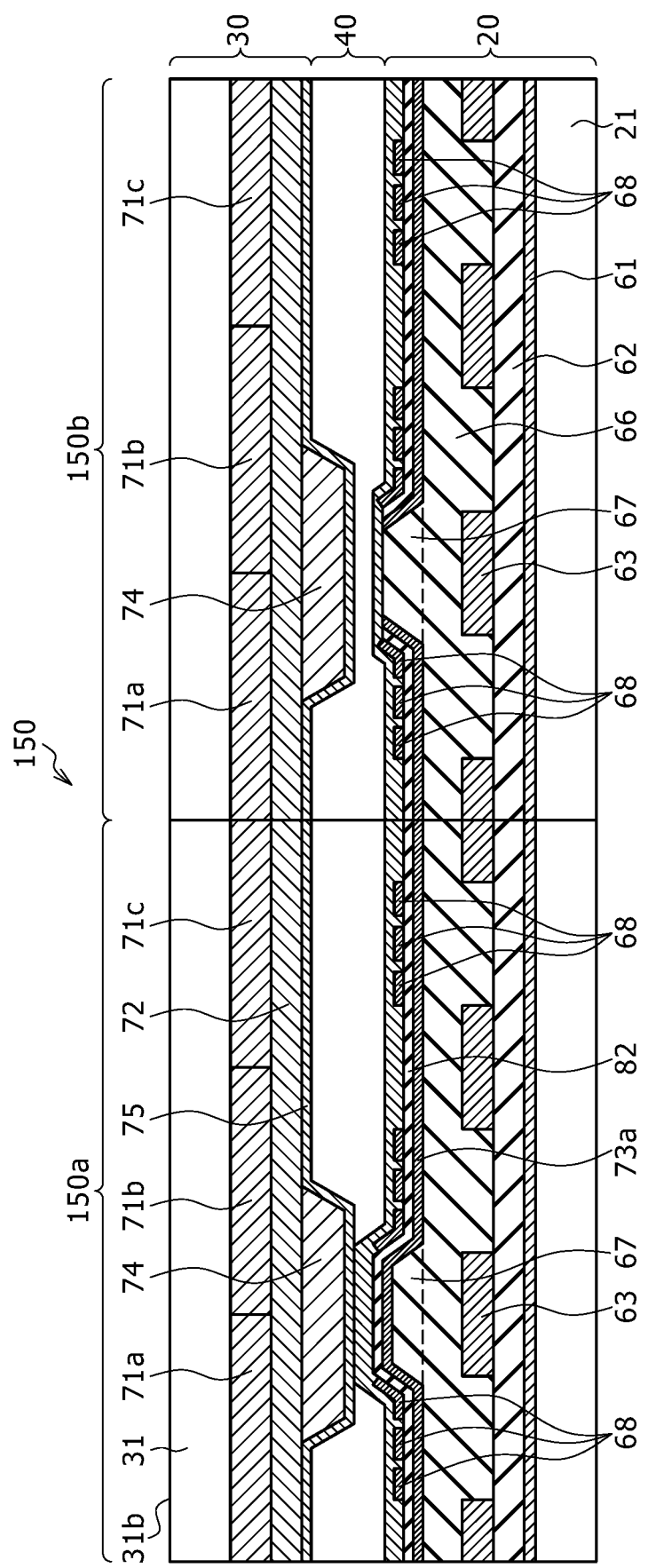
FIG. 12 is a cross-sectional view illustrating modification example 3.

FIG. 12 is a cross-sectional view illustrating modification example 3.

A liquid crystal display device 150 includes a section 150a that is configured in the same manner as the counterpart of the liquid crystal display device 120 of the third embodiment. Further, the liquid crystal display device 150 includes a section 150b that has the same structure as the liquid crystal display device 130 according to modification example 2 except that the gap between the array substrate 20 and opposed substrate 30 is larger so as to keep a distance between the orientation films 69 and 75.

That is, in the section 150a of the liquid crystal display device 150, the spacer section 74 rests on the spacer section 67. In the section 150b thereof, on the other hand, the spacer section 74 is left floating. Therefore, the liquid crystal display device 150 minimizes air bubbles in the gap and non-uniformity on image display as does the liquid crystal display device 140.

Further, the liquid crystal display device 150 also provides reduced likelihood of the spacer section 74 touching and damaging the film and element arranged in the opening region 53 while at the same time securing an area for the opening region 53.

Fifth Embodiment

A description will be given next of a fifth embodiment.

Figure 13:
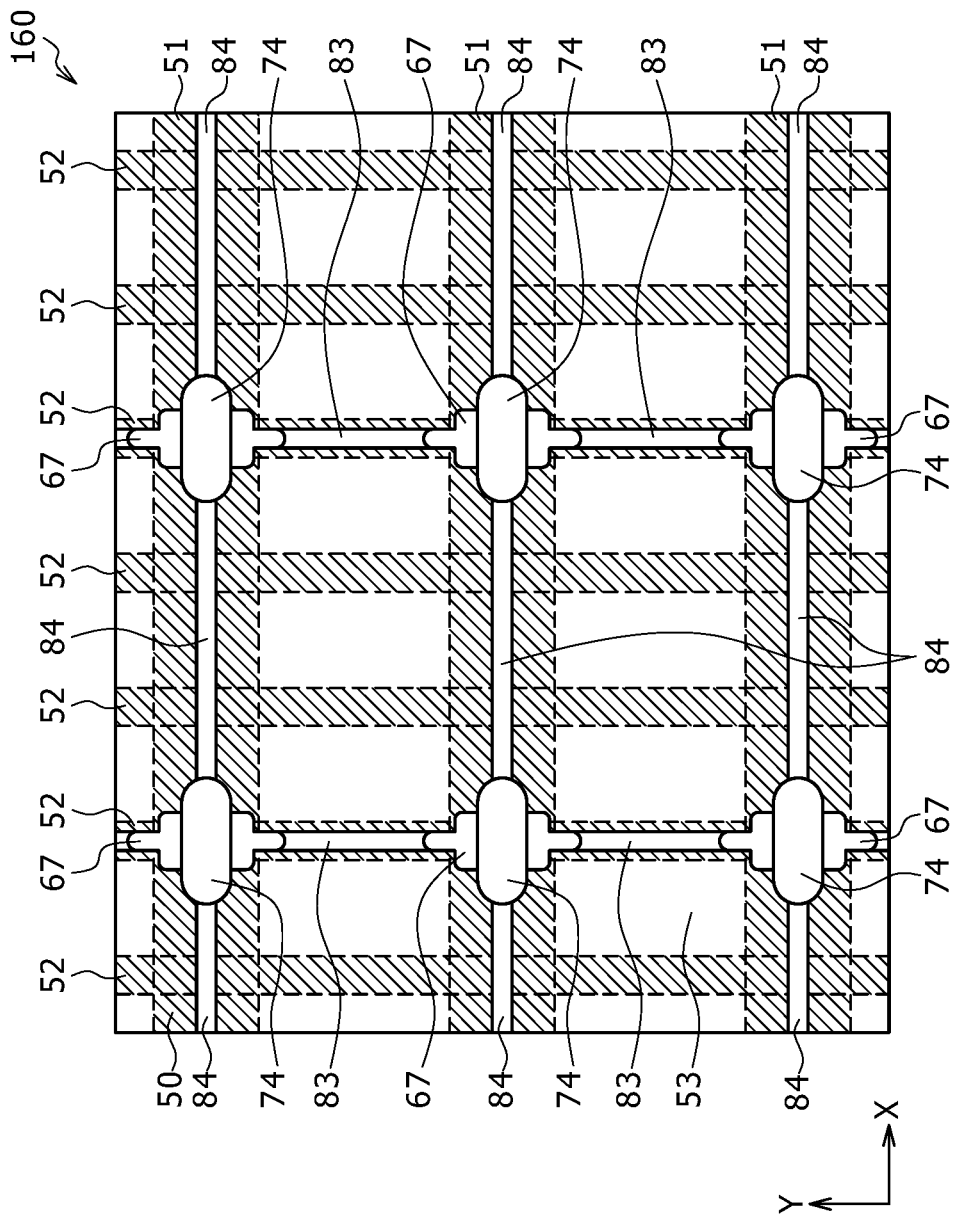
FIG. 13 is a top view illustrating an example of a liquid crystal display device according to a fifth embodiment.

FIG. 13 is a top view illustrating an example of a liquid crystal display device according to the fifth embodiment.

A liquid crystal display device 160 has the same structure as the liquid crystal display device 100 of the second embodiment except that the plurality of pairs of spacer sections 67 and 74 are formed. Further, each of the spacer sections 67 is connected to the other spacer section 67 adjacent thereto in the Y direction via a connection section 83. The connection sections 83 are, for example, formed integrally with the spacer sections 67.

Still further, each of the spacer sections 74 is connected to the other spacer section 74 adjacent thereto in the X direction via a connection section 84. The connection sections 84 are, for example, formed integrally with the spacer sections 74. The liquid crystal display device 160 is the same as the liquid crystal display device 100 in all the other respects.

This configuration provides reduced likelihood of the spacer section 74 touching and damaging the film and element arranged in the opening region 53 while at the same time securing an area for the opening region 53. Further, this configuration ensures, for example, that the connection sections 84 are supported by the connection sections 83 even if the array substrate 20 and opposed substrate 30 become significantly misaligned horizontally with each other, thus providing reduced likelihood of the spacer section 74 touching the film and element arranged in the opening region 53.

Sixth Embodiment

A description will be given next of a sixth embodiment.

Figure 14:
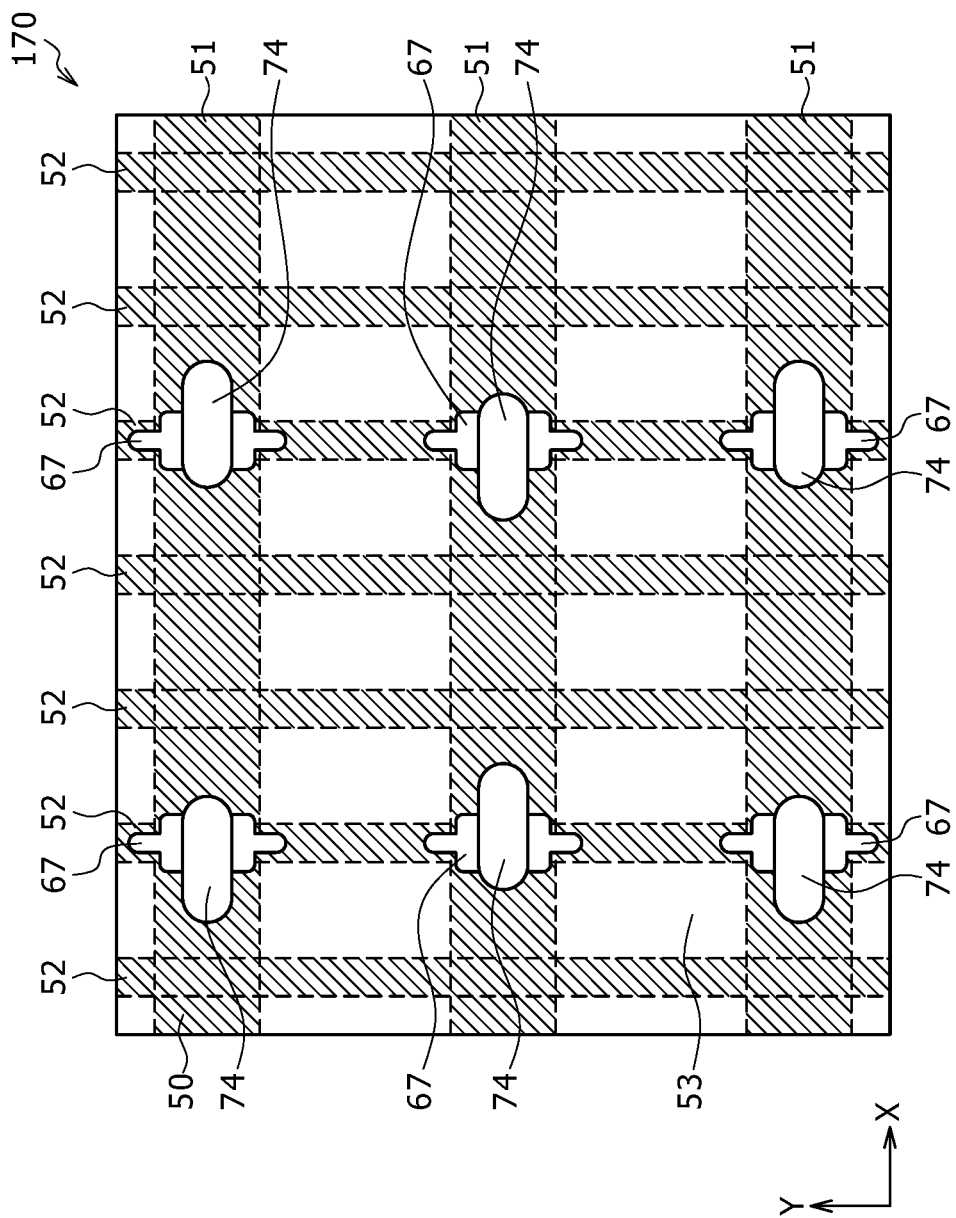
FIG. 14 is a top view illustrating an example of a liquid crystal display device according to a sixth embodiment.

FIG. 14 is a top view illustrating an example of a liquid crystal display device according to the sixth embodiment.

A liquid crystal display device 170 has the same structure as the liquid crystal display device 100 of the second embodiment except that the plurality of pairs of spacer sections 67 and 74 are formed. Further, the spacer sections 74 that are adjacent to each other in the Y direction are arranged to be misaligned with each other in the opposite directions along the X direction.

For example, the spacer sections 74 in the second row from the top and adjacent to each other in the X direction are shifted in such a manner as to be closer to each other. On the other hand, those in the first and third rows from the top and adjacent to each other in the X direction are shifted in such a manner as to be farther away from each other. It should be noted that the spacer sections 74 adjacent to each other in the X direction may be arranged to be misaligned with each other in the opposite directions along the Y direction. The liquid crystal display device 170 is the same as the liquid crystal display device 100 in all the other respects.

This configuration provides reduced likelihood of the spacer section 74 touching and damaging the film and element arranged in the opening region 53 while at the same time securing an area for the opening region 53.

Module and Application Examples

A description will be given next of application examples of the liquid crystal display devices described in the above embodiments with reference to FIGS. 15 to 19G. The liquid crystal display devices according to the above embodiments are applicable to electronic equipment across all disciplines adapted to display a video signal externally fed thereto or generated therein as an image or picture. Among examples of electronic equipment are a television set, digital camera, laptop personal computer, personal digital assistance such as mobile phone and video camcorder.

Application Example 1

Figure 15:
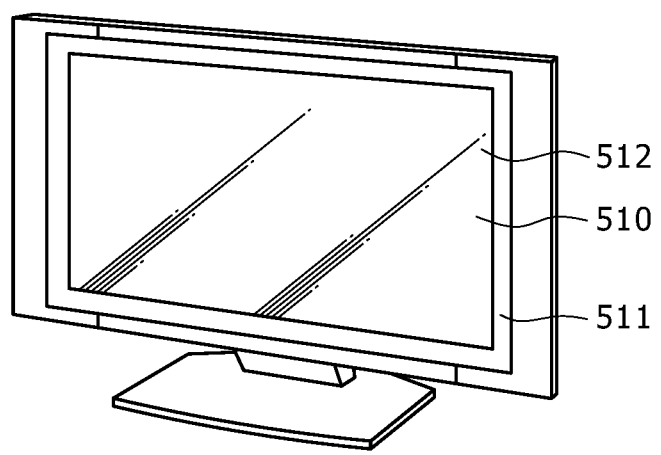
FIG. 15 is a diagram illustrating an example of appearance of a television set to which the liquid crystal display device is applied.

FIG. 15 illustrates an example of appearance of a television set to which the liquid crystal display device is applied. This television set has, for example, a video display screen section 510 including a front panel 511 and filter glass 512. The video display screen section 510 includes the liquid crystal display device according to one of the above embodiments.

Application Example 2

Figure 16A:
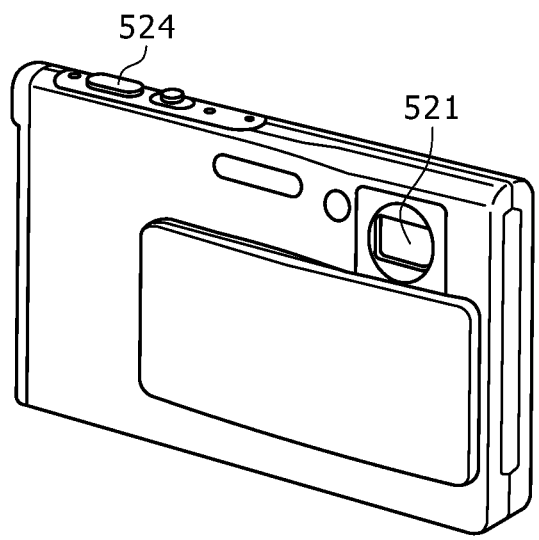
FIGS. 16A and 16B are diagrams illustrating an example of appearance of a digital camera to which the liquid crystal display device is applied.
Figure 16B:
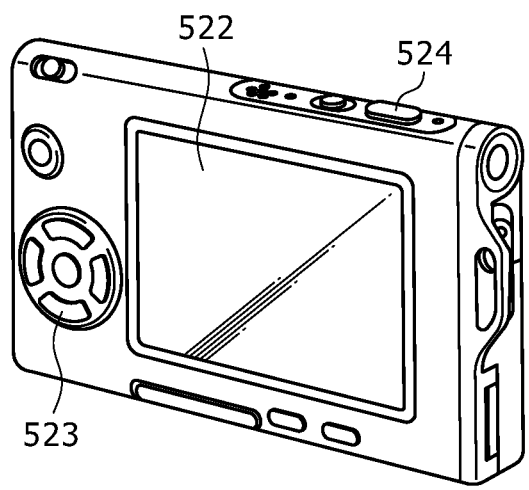

FIGS. 16A and 16B illustrate an example of appearance of a digital camera to which the liquid crystal display device is applied. FIG. 16A is a perspective view as seen from the front, and FIG. 16B a perspective view as seen from the rear. This digital camera has, for example, a flash-emitting section 521, display section 522, menu switch 523 and shutter button 524. The display section 522 includes the liquid crystal display device according to one of the above embodiments.

Application Example 3

Figure 17:
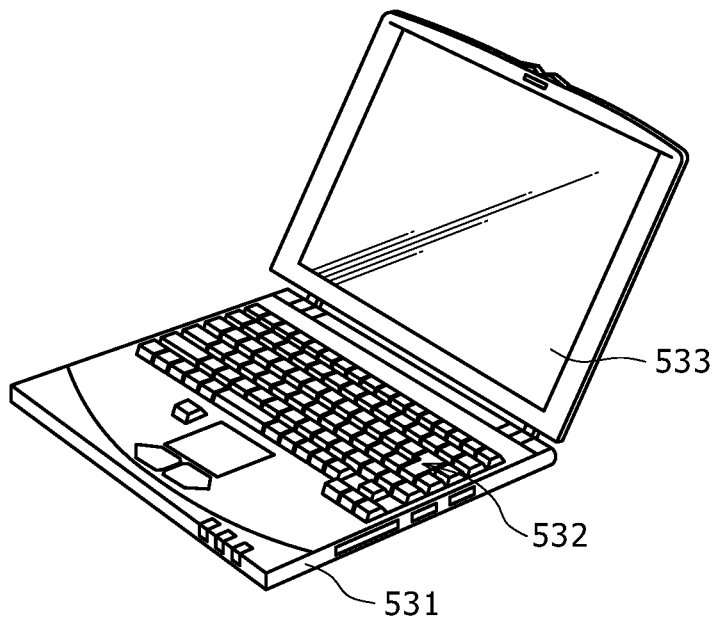
FIG. 17 is a diagram illustrating an example of appearance of a laptop personal computer to which the liquid crystal display device is applied.

FIG. 17 illustrates an example of appearance of a laptop personal computer to which the liquid crystal display device is applied. This laptop personal computer has, for example, a main body 531, keyboard 532 adapted to be manipulated for entry of text or other information and a display section 533 adapted to display an image. The display section 533 includes the liquid crystal display device according to one of the above embodiments.

Application Example 4

Figure 18:
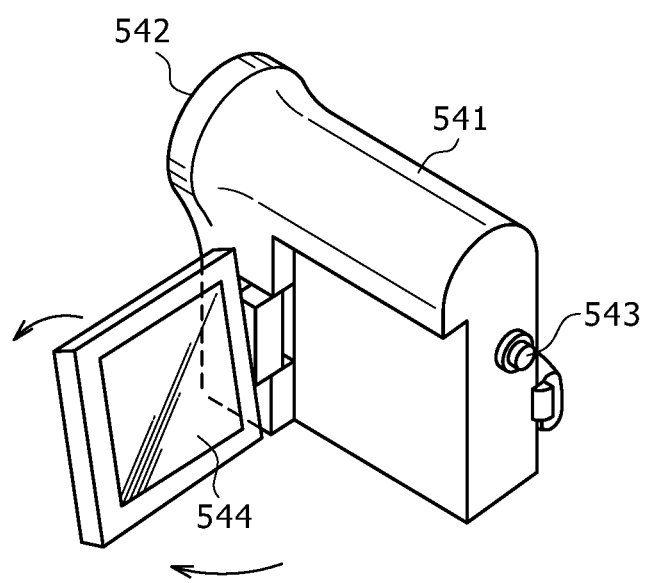
FIG. 18 is a diagram illustrating an example of appearance of a video camcorder to which the liquid crystal display device is applied.

FIG. 18 illustrates an example of appearance of a video camcorder to which the liquid crystal display device is applied. This video camcorder has, for example, a main body section 541, lens 542 provided on the front-facing side surface of the main body section 541 to capture the image of the subject, imaging start/stop switch 543 and display section 544. The display section 544 includes the liquid crystal display device according to one of the above embodiments.

Application Example 5

FIGS. 19A to 19G illustrate an example of appearance of a mobile phone to which the liquid crystal display device is applied. FIG. 19A is a front view of the mobile phone in an open position, FIG. 19B a side view thereof in FIG. 19A, FIG. 19C a front view thereof in a closed position, FIG. 19D a left side view thereof in FIG. 19C, FIG. 19E a right side view thereof in FIG. 19C, FIG. 19F a top side view thereof in FIG. 19C, and FIG. 19G a bottom side view thereof in FIG. 19C.

This mobile phone is made up, for example, of an upper enclosure 710 and lower enclosure 720 that are connected together with a connecting section (hinge section) 730 and has a display 740, subdisplay 750, picture light 760 and camera 770. Each of the display 740 and subdisplay 750 includes the liquid crystal display device according to one of the above embodiments.

It should be noted that the present application may have the following configurations.

(1) A liquid crystal display device including:
a first substrate having a first surface, the first surface including a light-shielding region in a lattice form and a plurality of opening regions surrounded by the light-shielding region, the light-shielding region including a plurality of first extended portions extending in a first direction and a plurality of second extended portions extending in a second direction that intersects the first direction, the first substrate having a plurality of transistors formed thereon;
a second substrate having a second surface that is opposed to and spaced from the first surface;
a liquid crystal layer arranged between the first and second surfaces;
a first spacer section having long sides oriented in the second direction and formed on one of the first or second surfaces, arranged at one of a plurality of intersections obtained as a result of each of the plurality of first extended portions intersecting one of the plurality of second extended portions and protruding into the liquid crystal layer; and
a second spacer section having long sides oriented in the first direction, formed on the other of the first or second surfaces, arranged at the intersection where the first spacer section is arranged in such a manner as to intersect the first spacer section and protruding into the liquid crystal layer.

(2) The liquid crystal display device according to the paragraph (1), in which
a gate line is formed on each of the plurality of first extended portions,
a source line is formed on each of the plurality of second extended portions,
an insulating film is formed above the first surface to cover the plurality of gate lines and the plurality of source lines,
the first spacer section is formed on the insulating film, and
the second spacer section is formed above the second surface.

(3) The liquid crystal display device according to the paragraph (2), in which
the first spacer section has two edge portions oriented in the longitudinal direction and an intermediate portion between the two edge portions, and
the width of the intermediate portion is greater than that of either or both of the edge portions.

(4) The liquid crystal display device according to the paragraph (2) or (3), in which
the first spacer section is made of the same material as the insulating film.

(5) The liquid crystal display device according to any one of the paragraphs (2) to (4), in which
a plurality of pixel electrodes and a common electrode are formed on the insulating film, and
the common electrode is formed to cover the first spacer section.

(6) The liquid crystal display device according to any one of the paragraphs (2) to (4), in which
a plurality of pixel electrodes and a common electrode are formed on the insulating film, and
the common electrode is formed to expose the first spacer section.

(7) The liquid crystal display device according to any one of the paragraphs (1) to (6), in which
the plurality of first spacer sections and the plurality of second spacer sections are formed, and
each of the plurality of first spacer sections and the plurality of second spacer sections is arranged at one of the plurality of intersections.

(8) The liquid crystal display device according to the paragraph (7), in which
the plurality of first spacer sections are arranged at some of the plurality of intersections rather than all thereof.

(9) The liquid crystal display device according to the paragraph (7) or (8), in which
each of the plurality of first spacer sections includes a third spacer section and a fourth spacer section lower in height than the third spacer section.

(10) The liquid crystal display device according to any one of the paragraphs (7) to (9), in which
the plurality of first or second spacer sections are connected to each other.

(11) The liquid crystal display device according to any one of the paragraphs (7) to (9), in which
of the plurality of first or second spacer sections, those adjacent to each other in one of the first or second directions are arranged to be misaligned with each other in the opposite directions along the other of the first or second directions.

(12) A manufacturing method of a liquid crystal display device including:

forming, on a first surface of a first substrate, a first spacer section having long sides in such a manner as to be located at one of a plurality of intersections obtained as a result of each of a plurality of first extended portions intersecting one of a plurality of second extended portions and have the long sides oriented in a second direction, the first substrate having the first surface, the first surface including a light-shielding region in a lattice form and a plurality of opening regions surrounded by the light-shielding region, the light-shielding region including the plurality of first extended portions extending in a first direction and the plurality of second extended portions extending in the second direction that intersects the first direction, the first substrate having a plurality of transistors formed thereon;

forming a second spacer section having long sides on a second surface of a second substrate;

arranging the first and second substrates in such a manner that the first and second surfaces are opposed to and spaced from each other, that the second spacer section is arranged at the intersection where the first spacer section is arranged, that the second spacer section has long sides oriented in the first direction, and that the second spacer section intersects the first spacer section; and forming a liquid crystal layer between the first and second surfaces.

(13) The manufacturing method of a liquid crystal display device according to the paragraph (12), in which a gate line is formed on each of the plurality of first extended portions, and a source line is formed on each of the plurality of second extended portions, and the process of forming the first spacer section includes forming, on the first surface, an insulating film in such a manner as to cover the plurality of gate lines and the plurality of source lines, and half-etching the formed insulating film with part of the insulating film left unetched.

(14) Electronic equipment including:

a liquid crystal display device configured to display an image, the liquid crystal display device having a first substrate having a first surface, the first surface including a light-shielding region in a lattice form and a plurality of opening regions surrounded by the light-shielding region, the light-shielding region including a plurality of first extended portions extending in a first direction and a plurality of second extended portions extending in a second direction that intersects the first direction, the first substrate having a plurality of transistors formed thereon, a second substrate having a second surface that is opposed to and spaced from the first surface;

a liquid crystal layer arranged between the first and second surfaces, a first spacer section having long sides oriented in the second direction and formed on one of the first or second surfaces, arranged at one of a plurality of intersections obtained as a result of each of the plurality of first extended portions intersecting one of the plurality of second extended portions and protruding into the liquid crystal layer, and a second spacer section having long sides oriented in the first direction, formed on the other of the first or second surfaces, arranged at the intersection where the first spacer section is arranged in such a manner as to intersect the first spacer section and protruding into the liquid crystal layer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A liquid crystal display device comprising: a first substrate having a first surface;

a second substrate having a second surface that is opposed to and spaced from the first surface; and a liquid crystal layer and a plurality of spacers arranged between the first and second surfaces, the spacers each including a first spacer section having a first center position that is a center of the first spacer section in a first direction, the first spacer section protruding from the first surface into the liquid crystal layer, a second spacer section having a second center position that is a center of the second spacer section in the first direction, the second spacer section protruding from the second surface into the liquid crystal layer and opposed to and spaced from the first spacer section or being in contact with the first spacer section, wherein, in each of the spacers, the second center position is different from the first center position in the first direction, the first spacer section has a first width in a first direction and is lengthwise in a second direction intersecting the first direction, the second spacer section has a second width in the second direction and is lengthwise in a first direction, the first substrate has a plurality of source lines extending in the second direction, the source lines include a first source line, the spacers includes a lower-right spacer and a upper-right spacer that is adjacent to the lower-right spacer in the second direction, each of the lower-right spacer and the upper-right spacer has:

the first spacer section having the first center position; and the second spacer section having the second center position, the first center position of the lower-right spacer and the first center position of the upper-right spacer are aligned along the first source line, the second center position of the lower-right spacer is arranged at one side relative to the first source line, and the second center position of the upper-right spacer is arranged at the other side relative to the first source line.

2. The liquid crystal display device according to claim 1, wherein the second spacer section is arranged in such a manner to intersect the first spacer section.

3. The liquid crystal display device according to claim 1, wherein the source lines further include a second source line adjacent to the first source line in the first direction, the spacers includes a lower-left spacer that is adjacent to the lower-right spacer in the first direction and a upper-left spacer that is adjacent to the spacer in the first direction, each of the lower-left spacer and the upper-left spacer has: the first spacer section having the first center position; and the second spacer section having the second center position, the first center positions of the lower-left spacer and the upper-left spacer are aligned along the second source line extending in the second direction, the second center position of the lower-left spacer is arranged at one side relative to the second source line, the second center position of the upper-left spacer is arranged at the other side relative to the second source line, and a distance between the second center positions of the first lower-right spacer and the lower-left spacer are longer than a distance between the second center positions of the upper-right spacer and the upper-left spacer.

4. The liquid crystal display device according to claim 1, wherein the second center positions of the spacers are staggered in the second direction.

5. The liquid crystal display device according to claim 1, wherein the first spacer section has a pair of edge portions and an intermediate portion that is between the pair of edge portions in the second direction, and a length of the intermediate portion of the first spacer section in the second direction is greater than the second width of the second spacer section.

6. The liquid crystal display device according to claim 1, wherein the first center positions of the lower-right spacer and the upper-right spacer are aligned along in the second direction, the second center position of the lower-right spacer is arranged at one side relative to a first virtual line connecting the first center position of the lower-right spacer and the first center position of the upper-right spacer, and the second center position of the upper-right spacer is arranged at the other side relative to the first virtual line.

7. The liquid crystal display device according to claim 6, wherein the spacers include a lower-left spacer that is adjacent to the lower-right spacer in the first direction and a upper-left spacer that is adjacent to the upper-right spacer in the first direction, each of the lower-left spacer and the upper-left spacer has:
the first spacer section having the first center position; and
the second spacer section having the second center position, the first center positions of the lower-left spacer and the upper-left spacer are aligned along the second direction, the second center position of the lower-left spacer is arranged at one side relative to a second virtual line connecting the first center position of the lower-left spacer and the first center position of the upper-left spacer, the second center position of the upper-left spacer is arranged at the other side relative to the second virtual line, and a distance between the second center positions of the lower-right spacer and the lower-left spacer are longer than a distance between the second center positions of the upper-right spacer and the upper-left spacer.

8. The liquid crystal display device according to claim 1, wherein the first spacer section has a pair of edge portions and an intermediate portion that is between the pair of edge portions in the second direction, the pair of edge portions extend from the intermediate portion in the second direction with an edge width in the first direction, the intermediate portion has the first width greater than the edge width.

9. The liquid crystal display device according to claim 8, wherein the first spacer section is arranged in such a manner that the pair of edge portions overlap one of the source lines.

10. The liquid crystal display device according to claim 8, wherein the first substrate has a plurality of gate lines, the first spacer section is arranged in such a manner that the intermediate portion overlaps an intersection of one of the source lines and one of the gate lines and that the pair of edge portions overlap one of the source lines.

11. The liquid crystal display device according to claim 1, wherein the first substrate further includes:

a plurality of gate lines extending in the first direction;

a light-shielding region that is in a lattice form and includes first shielding portions each overlapping an entire length of one of the gate lines and second shielding portions each overlapping an entire length of one of the source lines; and opening regions surrounded by the light-shielding region, the second spacer section is lengthwise along the gate lines, and the second width of the second spacer section is smaller than a first shielding width that is a width of the first shielding portions in the second direction.

12. The liquid crystal display device according to claim 11, wherein the first spacer section is lengthwise in the second direction that intersects the gate lines, and a length of the first spacer section between both ends of the pair of edge portions in the second direction is greater than the first shielding width.

13. The liquid crystal display device according to claim 11, wherein the first spacer section has a pair of edge portions and an intermediate portion that is between the pair of edge portions in the second direction, the pair of edge portions extend from the intermediate portion in the second direction with an edge width in the first direction, a second shielding width that is a width of the second shielding portion in the first direction is greater than a width of each of the source lines in the first direction, the edge width of the edge portions is smaller than the second shielding width.

14. The liquid crystal display device according to claim 11, wherein the first width of the intermediate portion of the first spacer section is greater than a second shielding width that is a width of the second shielding portion in the first direction.

15. The liquid crystal display device according to claim 11, wherein a light-shielding film is disposed on the second substrate to overlap the light-shielding region.

* * * * *